US009783320B2

(12) United States Patent
Barnes et al.

(10) Patent No.: US 9,783,320 B2
(45) Date of Patent: Oct. 10, 2017

(54) AIRPLANE COLLISION AVOIDANCE

(71) Applicant: DM3 AVIATION LLC, Cypress, TX (US)

(72) Inventors: Megan D. Barnes, Cypress, TX (US); Michael W. Delk, Salem, OR (US); Richard L. Tutwiler, Port Matilda, PA (US); John R. Durkin, Port Matilda, PA (US); David E. Barnes, Jr., Cypress, TX (US)

(73) Assignee: DM3 AVIATION LLC, Cypress, TX (US)

( * ) Notice: Subject to any disclaimer, the term of this patent is extended or adjusted under 35 U.S.C. 154(b) by 64 days.

(21) Appl. No.: 15/258,913

(22) Filed: Sep. 7, 2016

(65) Prior Publication Data
US 2017/0200380 A1    Jul. 13, 2017

Related U.S. Application Data

(63) Continuation of application No. 14/660,487, filed on Mar. 17, 2015, now Pat. No. 9,469,416.

(60) Provisional application No. 61/954,405, filed on Mar. 17, 2014.

(51) Int. Cl.
*G08G 5/04* (2006.01)
*B64D 47/08* (2006.01)

(52) U.S. Cl.
CPC .......... *B64D 47/08* (2013.01); *B64D 2205/00* (2013.01)

(58) Field of Classification Search
USPC ........................................................ 701/301
See application file for complete search history.

(56) References Cited

U.S. PATENT DOCUMENTS

| 4,745,410 A | 5/1988 | Schuller |
| 5,659,318 A | 8/1997 | Madsen |
| 6,118,401 A | 9/2000 | Tognazzini |
| 6,246,320 B1 | 6/2001 | Monroe |

(Continued)

FOREIGN PATENT DOCUMENTS

| DE | 102008050617 A1 | 5/2009 |
| EP | 2433870 A2 | 3/2012 |

OTHER PUBLICATIONS

Backup Camera System for Airport Vehicles; Veise Alibaba Apr. 15, 2013; retrieved from: <http://www.alibaba.com/products-gs/551534061/Backup_Camera_System_for_Airport_Vehicles.html>; 4 pages.

(Continued)

*Primary Examiner* — Anne M Antonucci
(74) *Attorney, Agent, or Firm* — Schwabe Williamson & Wyatt, PC

(57) ABSTRACT

A collision avoidance system for an airplane under tow may include a sensing device configured to capture image data of at least a portion of the airplane and an object while the airplane is being towed. The sensing device may be located remotely to both the airplane and the object. Positions of two or more features of the airplane may be determined based on the image data. A bounding box encompassing the airplane may be generated based, at least in part, on the positions of the two or more features. Additionally, based on a comparison of the position of an object relative to the bounding box, it may be determined whether the object is within a predetermined distance from the airplane.

14 Claims, 19 Drawing Sheets

(56) References Cited

U.S. PATENT DOCUMENTS

| | | |
|---|---|---|
| 6,414,746 B1 | 7/2002 | Stettner |
| 6,480,789 B2 | 11/2002 | Lin |
| 6,486,798 B2 | 11/2002 | Rast |
| 7,379,165 B2 | 5/2008 | Anderson |
| 7,479,925 B2 | 1/2009 | Schell |
| 7,579,980 B2 | 8/2009 | Anderson |
| 7,869,305 B2 | 1/2011 | Anderson |
| 7,932,838 B2 | 4/2011 | Hamza |
| 8,130,367 B2 | 3/2012 | Stettner |
| 8,264,377 B2 | 9/2012 | Griffith |
| 8,294,809 B2 | 10/2012 | Stettner |
| 8,358,404 B2 | 1/2013 | Stettner |
| 8,401,774 B2 | 3/2013 | Ravenscroft |
| 8,599,303 B2 | 12/2013 | Stettner |
| 8,606,496 B2 | 12/2013 | Stettner |
| 8,692,980 B2 | 4/2014 | Gilliland |
| 8,743,176 B2 | 6/2014 | Stettner |
| 8,797,512 B2 | 8/2014 | Stettner |
| 8,878,978 B2 | 11/2014 | Stettner |
| 8,976,340 B2 | 3/2015 | Gilliland |
| 2002/0030741 A1* | 3/2002 | Broemmelsiek ...... G01S 3/7864 348/169 |
| 2005/0196256 A1 | 9/2005 | Rodenkirch |
| 2006/0287829 A1 | 12/2006 | Pashko-Paschenko |
| 2008/0062011 A1 | 3/2008 | Butler |
| 2008/0306691 A1 | 12/2008 | Louis |
| 2010/0219988 A1* | 9/2010 | Griffith ................. G01S 13/931 340/961 |
| 2011/0087417 A1 | 4/2011 | Anderson |
| 2011/0257929 A1* | 10/2011 | Richter ..................... B64F 1/22 702/150 |
| 2012/0200433 A1 | 8/2012 | Glover |
| 2014/0062756 A1 | 3/2014 | Lamkin |
| 2014/0063200 A1 | 3/2014 | Stettner |
| 2014/0067164 A1 | 3/2014 | Papadopoulos |
| 2014/0350836 A1 | 11/2014 | Stettner |
| 2015/0262492 A1 | 9/2015 | Barnes |

OTHER PUBLICATIONS

Subbotin, N.; Development of an Airport Ground Vehicle Runway Incursion Warning System (Final Report); Air Traffic Organization NextGen & Operations Planning Office of Research and Technology Development, Washington, DC 20591; Oct. 2011; retrieved from: <http:www.tc.faa.gov/its/worldpac/techrpt/ar11-26.pdf>; 40 pages.

* cited by examiner

AIRPLANE COLLISION AVOIDANCE

RELATED APPLICATIONS

This application is a continuation of U.S. patent application Ser. No. 14/660,487, filed on Mar. 17, 2015, which issued on Oct. 18, 2016 as U.S Pat No. 9,469,416, and entitled Airplane Collision Avoidance, which claims the benefit of U.S. Provisional Application No. 61/954,405, filed Mar. 17, 2014, the contents of which are herein incorporated by reference in their entirety.

BACKGROUND

A major cause of incidents at airports occurs during movement of airplanes or vehicles around other airplanes or objects. This annually causes significant claims to insurance companies as well as to airplane owners, fixed base operators, and airlines. To reduce the number of incidents, operators at airports have required workers to walk under the wings of an airplane under tow to identify prospective collisions before they occur, referred to as "wing walkers."

The implementation of wing walkers has reduced the number of incidents, but requires staff resources and is quite expensive. In order to view the various portions of an airplane at risk of collision, two wing walkers may be required at both wing tips of the airplane and for larger airplanes a third walker may be located at the tail of the airplane. The multiple wing walkers may be in addition to an operator of the tug towing the airplane. Additionally, personnel located at or near the ground level may not be able to accurately judge the relative height of an oncoming object with a wing or tail which can be dozens of feet up in the air.

Further, communication among the wing walkers and the operator of the tug may be a challenge. Due to the amount of noise at airports, communication between the wing walkers and the operator is often limited to physical motions or whistles being blown by the wing walkers as the airplane is approaching an object. Visually, it may be difficult for the operator to maintain a line of sight with the wing walkers to perceive the physical motions. Similarly, when using whistles, there is a chance that the whistles will be drowned out by other noises, or that the operator may mistake a whistle associated with another airplane under tow. Accordingly, it can be difficult to move multiple airplanes within the same vicinity.

The present application addresses these and other problems.

SUMMARY

A collision avoidance system for an airplane under tow is disclosed herein. The system may include a sensing device configured to capture image data of at least a portion of the airplane and an object while the airplane is being towed. The sensing device may be located remotely to both the airplane and the object. Positions of two or more features of the airplane may be determined based on the image data. A bounding box encompassing the airplane may be generated based, at least in part, on the positions of the two or more features. Additionally, based on a comparison of the position of an object relative to the bounding box, it may be determined whether the object is within a predetermined distance from the airplane.

A method of towing an airplane is disclosed herein. The method may include capturing image data of at least a portion of the airplane and an object while the airplane is being towed. The sensing device may be located remotely to both the airplane and the object. Positions of two or more features of the airplane as well as the position of the object may be determined based on the image data. The method may further comprise generating a bounding box encompassing the airplane based, at least in part, on the positions of the two or more features, and determining whether the object is within a predetermined distance from the airplane based on a comparison of the position of the object relative to the bounding box.

A collision avoidance system for an aircraft under tow is disclosed herein. The system may include a sensing device configured to capture image data of at least a portion of the aircraft and an object while the aircraft is being towed. A processing device may be configured to determine, based on the image data, a first distance from the sending device to the feature and a second distance from the sensing device to the position of the object. The processing device may be further configured to determine, based at least in part on the first distance, a position of the feature, and generate a bounding box that encompasses the airplane based, at least in part, on the position of the feature. A position of the object may be determined based on the second distance. Additionally, the processing device may be configured to determine whether the object is within a predetermined distance from the aircraft based on a comparison of the position of the obstacle relative to the bounding box.

DETAILED DESCRIPTION

Figure 1:
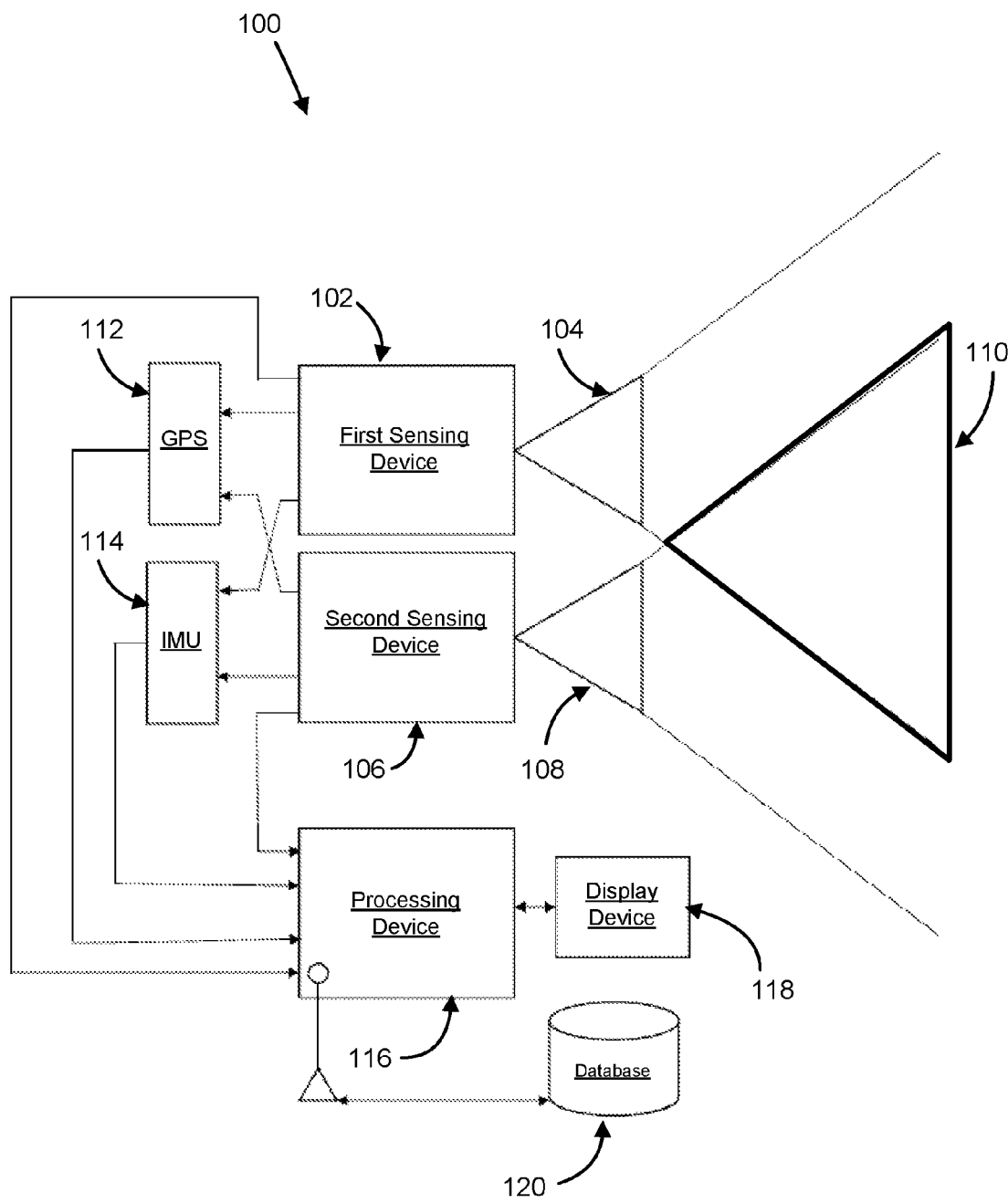
FIG. 1 illustrates an example airplane collision avoidance system (ACAS) including a first sensing device and a second sensing device.

FIG. 1 illustrates an example airplane collision avoidance system (ACAS) 100 including a first sensing device 102 and a second sensing device 106. The first sensing device 102 and the second sensing device 106 may be located in a close vicinity to each other, such that both sensing devices may be configured to capture images having substantially the same field of view. For instance, a first field of view 104 of the first sensing device 102 and a second field of view 108 of the second sensing device 106 may have an overlapping field of view 110, where both sensing devices 102, 104 may be configured to capture images of objects within the overlapping field of view 110.

The first sensing device 102 may determine distances to objects located within the first field of view 104. In some examples the first field of view 104 may be 70 degrees, although other degrees of field of view are contemplated herein. The first sensing device 102 may emit signals over the first field of view 104. The signals may reflect off of objects within the first field of view 104 producing reflected rays that are captured by the first sensing device 102 as pixels. The first sensing device 102 may determine a distance to captured objects based on the time it takes for the reflected rays to return to the first sensing device 102. Each pixel of an image produced by the first sensing device 102 may indicate a distance to the object associated with the pixel. For example, the first sensing device 102 may comprise a sensor or camera, such as a LIDAR camera or a flash LIDAR camera, that emits light photons over the first field of view 104 and produces pixels indicating distances to objects captured. The first sensing device 102 may comprise any camera or sensor that may determine distances to an object.

The second sensing device 106 may capture colors of objects located within the second field of view 108. Each pixel within an image captured by the second sensing device 106 may indicate a color of an object captured by the pixel. The second sensing device 106 may comprise a conventional color VNIR camera, a color SWIR camera, a color MWIR camera, a color LWIR camera, a Hyperspectral camera, any camera that captures an image in color, any camera that captures an image in black and white or grayscale, any sensing device that captures an in color, black and white or grayscale, or any combination thereof.

A global positioning system (GPS) 112 may be communicatively coupled to one or both of the first sensing device 102 and the second sensing device 106. The GPS 112 may be configured to receive data from the first sensing device 102 and the second sensing device 108 and determine translational parameters, such as relative direction, of one or both of the sensing devices. Further, the GPS 112 may be configured to determine locations of one or both of the first sensing device 102 and the second sensing device 108, the ACAS 100, or any combination thereof.

In some examples, the GPS 112 may further be able to determine coordinates or locations of objects captured and/or identified by the ACAS 100. The GPS 122 may store an indication of an object and a location of the object. The location may be stored as a set of coordinates, although it is to be understood that any means of indicating the location may be stored. Based on the stored indications and coordinates or locations, the ACAS 100 may generate a map showing the location of captured objects on the map. In some examples, as the ACAS 100 moves within a vicinity of an object stored by the GPS 112, the location of the object may appear and be indicated on the map.

The GPS 112 may further determine whether the objects captured and/or identified by the ACAS 100 should be stored. The GPS 112 may determine whether the captured object is moving and decide, based on the object moving, that the object should not be stored. For example, if a truck drives through the first field of view 104 or the second field of view 108, the GPS 112 may determine that the truck is moving and determine that the truck should not be stored since it will likely not be in the same location at a later time period.

The stored indications and locations may degrade over a time period. For instance, a stored indication and location of an object captured may be removed from storage if an image of the object is not captured at the location for a period of 24 hours, e.g., the object has moved or been moved since the last image was captured. In some examples, the stored indications and locations may be reset after a time period, thereby deleting all of the stored indications and locations at a certain time period.

An inertial measurement unit (IMU) 114 may be communicatively coupled to one or both of the first sensing device 102 and the second sensing device 106. The IMU 114 may receive data from the first sensing device 102 and the second sensing device 108 and determine rotational parameters of each. The rotational parameters may include, for example, yaw, roll and pitch angles for one or both of the first sensing device 102 and the second sensing device 106. Determining differences in the rotational parameters of the first sensing device 102 and the second sensing device 106 may indicate that the first sensing device 102 and the second sensing device 106 captured images of different fields of view.

Further, the IMU 114 may be configured to determine a speed, an angle, a direction, or any combination thereof, at which the ACAS 100 is traveling. The IMU 114 may be able to determine these components independent from receiving information from other devices. For example, if the ACAS 100 is in a location where a network cannot be accessed to receive data, the IMU 114 may still be able to determine any of the speed, the angle, or the direction.

A processing device 116 may receive the images captured by the first sensing device 102 and/or the second sensing device 106. The processing device 116 may generate a fused image including data from the images captured by one or both of the first sensing device 102 and the second sensing device 106. For example, the fused image may be an image for the overlapping field of view 110 with the pixels of the fused image indicating both the distance to objects captured by the first sensing device 102 and the colors of the objects captured by the second sensing device 106.

The process of fusing the images may involve overlaying the pixels of the image captured by the first sensing device 102 and the pixels of the image captured by the second sensing device 106. In some examples, the processing device 116 may use the translational parameters received from the GPS 112 and the rotational parameters received from the IMU 114 to generate the fused image. For example, if the processing device 116 determines that the image captured by the first sensing device 102 is translated in a direction from the image captured by the second sensing device 106, the processing device 116 may translate the pixels of one or both of the images such that the captured images are aligned or boresighted. Further, the processing device 116 may compensate for any differences in the rotational parameters between the two images.

In some examples, the processing device may be used to determine a current location of the ACAS 100. The processing device 116 may receive a sensed location of the ACAS 100 from the GPS 112 and store the sensed location. In a situation where the GPS 112 loses communication with a satellite or network providing it with information to sense the current location of the ACAS 100, the processing device 116 may access the most recently stored sensed location and utilize one or more of the speed, angle, or direction of travel obtained from the IMU 114 to determine a current location of ACAS 100. In still other examples, the current location of the ACAS 100 may be determined based on stored GPS coordinates for one or more surrounding objects which are captured or identified by the ACAS 100. Maintaining and updating the relative position of the ACAS 100 may be useful when the ACAS 100 is located in a hangar or where the GPS 112 may otherwise lose contact with its satellite or network.

A display device 118 may be communicatively coupled to the processing device 116. The display device 118 may be configured with a screen for displaying the image captured by the first sensing device 102, the image captured by the second sensing device 106, the fused image produced by the processing device 116 or any combination thereof. The display device 118 may further include input means, such as a keypad or mouse, allowing a user of the device to request the display device 118 to display a certain one of the available images. In response to receiving an input, the processing device 116 may prompt the display device 118 to display the image associated with the input.

In some examples, the display device 118 may zoom in on portions of an image in response to an input request. In response to receiving the input request to zoom in, the ACAS 100 may be configured to decrease the area captured by the overlapping field of view 110 to correspond to the portion of the image being zoomed in on. By reducing the area captured by the overlapping field of view 110, the precision of the image may be increased since the pixels of the first sensing device 102 and the second sensing device 106 are associated with a smaller area.

Further, the display device 118 may display a modified viewpoint image from a different point of view than the first sensing device 102 and the second sensing device 106. In response to a request to for a modified viewpoint image, the processing device may generate a modified viewpoint image based on one or more of the images captured by the first sensing device 102, the image captured by the second sensing device 106, and the fused image. For example, the modified viewpoint image may show a view from a 45 degree angle to the locations of the first sensing device 102 and the second sensing device 106 by utilizing the distance and color provided by the pixels obtained by the first sensing device 102 and the second sensing device 106 and producing the image with the view from the 45 degree angle.

The ACAS 100 may further include a database 120 for storing information generated and derived from the images captured by the first sensing device 102 and the second sensing device 106, including the fused images produced by the processing device 116, other types of images, or any combination thereof. The images stored on the database 120 may be stored for a period of time and accessed later to display an image associated with a particular time period. For example, displaying the images at a later time may be useful for determining the cause of damage to an airplane that occurred during movement of the airplane. In some examples, the database 120 may further store additional vehicle information such as travel speed and geographic location of the airplane, as well as an identification of objects involved in a collision for insurance or fleet management purposes.

In some examples, the database 120 may reside on an airplane, such as in a flight data recorder or black box of the airplane. In other examples, the database 120 may comprise one or more storage devices located in multiple different locations and the stored information may selected on all the storage devices, selected portions of the stored information may be stored on each device, or any combination thereof.

The ACAS 100, or some of the features of the ACAS 100, may include a self-contained energy source, such as a battery. In other examples, the ACAS 100 may be coupled to an electrical system of the airplane, a tug towing the airplane, some other power system, or a combination thereof from which it draws power.

In some examples, the ACAS 100, may communicate with other ACAS within proximity to the ACAS 100. The other ACAS may provide additional information with respect to potential and incoming objects that may be used to augment the information captured by the ACAS 100. In further examples, the ACAS 100 may share the database 120 with the other ACAS and may access data produced by the other ACAS to augment the information captured by the ACAS 100. Each ACAS may be associated with a unique identifier. The ACAS 100 may be configured to transmit the unique identifier, along with other information, to identify the ACAS, an airplane the ACAS is operating on, a tug the ACAS is operating on, or any combination thereof.

Further, the ACAS 100 may transmit a signal letting the other ACAS know its position. The ACAS 100 may receive one or more other signals from the other ACAS to determine the position of the other ACAS. Knowing the relative locations of the one or more ACAS may enable the ACAS 100 to avoid collisions and/or take evasive actions.

Figure 2:
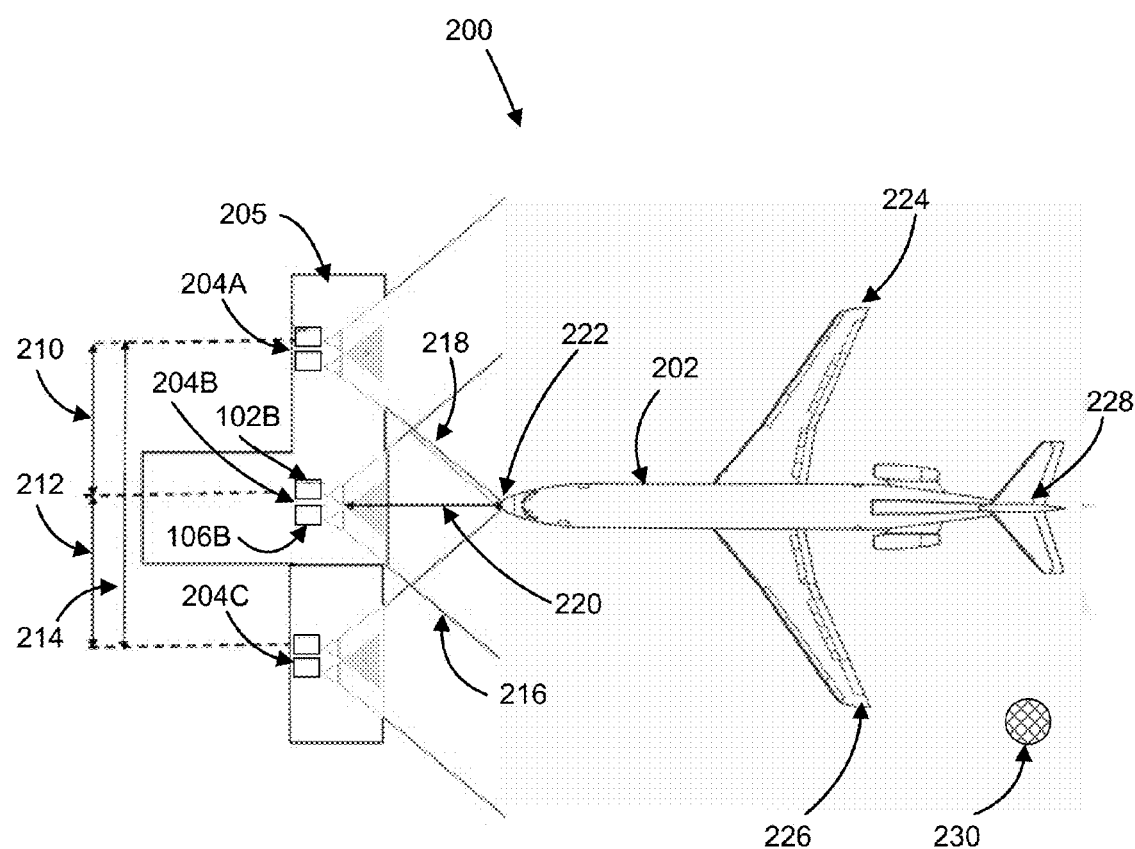
FIG. 2 illustrates an example ACAS configured to monitor an airplane.

FIG. 2 illustrates an example ACAS 200 configured to monitor an airplane 202. The ACAS 200 may be utilized whenever the airplane 202 is being moved locations. For example, the ACAS 200 may be used while moving the airplane to or from a passenger loading terminal, whiles towing the airplane to or from storage, or any combination thereof.

The ACAS 200 may include one or more sensing device assemblies, such as sensing device assemblies 204A, 204B and 204C. While three sensing device assemblies are illustrated in FIG. 2, using more or fewer assemblies is contemplated herein. Each sensing device assembly may be spaced apart from each other, for example at a distance 210 between the sensing device assemblies 204A and 204B and a distance 212 between the sensing device assemblies 204B and 204C. The sensing device assemblies 204A, 204B and 204C may be substantially aligned along a single plane, wherein a distance 214 between the sensing device assemblies 204A and 204C may be equal to the total of distance 210 and distance 214.

The sensing device assemblies 204A, 204B and 204C may be mounted on a mounting structure 205, which maintains the relative distance between the sensing device assemblies 204A, 204B and 204C. The mounting structure 205 may be located on a vehicle located remotely to the airplane, such as on a tug vehicle.

In some examples, the mounting structure 205 may be configured to vary the locations of the sensing device assemblies 204A, 204B and 204C in either or both of the horizontal and vertical directions. For example, sensing device assembly 204B located in the center of the mounting structure may set on a vertical member that allows the sensing device assembly to be adjusted in the vertical direction to a desired height based on the size of the airplane 202. Increasing the height at which the sensing device assembly 204B is located may allow the ACAS 200 to capture a greater portion of the airplane 202, such as a tail 228 of the airplane, which would not be within a field of view 216 if the sensing device assembly 204B was located at a lower height.

Each sensing device assembly 204A, 204B and 204C may include a first sensing device, such as first sensing device 102B, and a second sensing device, such as second sensing device 106B, configured to capture overlapping images of a portion of the airplane 202. The portion of the airplane 202 may include an exterior of the airplane 202, including a nose 222 of the airplane 202, a first wing tip 224 of the airplane 202, a second wing tip 226 of the airplane 202, the tail 228, a fuselage of the airplane 202, or any combination thereof. The first sensing device 102B may include one or more of the features of the first sensing device 102 (FIG. 1) and the second sensing device 106B may include one or more of the features of the second sensing device 106 (FIG. 1). In some examples, each sensing device assembly 204A, 204B and 204C may include a single sensing device, such as the first sensing device 102B.

The first sensing device 102B may be set to determine a distance 220 to a nose 222 of the airplane 202. The first sensing device 102B may transmit signals, such as photons, over a field of view 216 in the direction of the nose 222 of the airplane 202. Upon contacting the nose 222 of the airplane 202, the signals may be reflected toward the first sensing device 102B generating reflected rays 218. The first sensing device 102B may capture a portion of the reflected rays 218 to generate an image with pixels indicating a distance to an object captured by each respective pixel. The distance for each respective pixel may be determined based on an amount of time it takes for a corresponding signal to return to the first sensing device 102B. One or both of the first sensing device 102B or a processing device, such as processing device 116 (FIG. 1) may identify the nose 222 of the airplane 202 in the image and determine the distance 220 to the nose 222 based on the distance indicated by pixels of the image associated with the nose 222.

In examples including a second sensing device 106B, the second sensing device 106B may be directed at the nose 222 of the airplane 202 and may capture an image indicating the colors of the nose 222. The image captured by the first sensing device 102B may be fused with the second sensing device 106B by the fusion process discussed above referring to FIG. 1. Identifying the nose 222 of the airplane 202 may further include verifying that a color indicated by a pixel corresponding to a predicted location of the nose 222 of the airplane 202 predicting by based on the image of the first sensing device 102B is the color that the nose 222 is expected to be.

The sensing device assemblies 204A, 204B and 204C may each be configured to capture a different portion of the airplane 202 or to capture different features of the airplane 202 due to different fields of view of the sensing device assemblies 204A, 204B and 204C and/or due to the relative distances between each sensing device assembly. A non-exclusive list of some of the features that may be captured by the images includes the nose 222 of the airplane 202, a first wing tip 224 of the airplane 202, a second wing tip 226 of the airplane 226, a tail 228 of the airplane, or any combination thereof.

In some examples, the sensing device assemblies 204A, 204B and 204C may be equipped with pan and tilt control. The sensing device assemblies 204A, 204B and 204C may be manually or automatically panned or tilted to capture a desired portion in the airplane 202. Further, the sensing device assemblies 204A, 204B and 204C may be configured to automatically pan and tilt to maintain view of the airplane 202 as the airplane moves relative to the mounting structure 205.

In some examples, the ACAS 200 may be communicatively coupled to a GPS, such as GPS 112 (FIG. 1), an IMU, such as IMU 114 (FIG. 1), a processing device, such as processing device 116 (FIG. 1), or any combination thereof. The ACAS 200 may be wirelessly coupled by Bluetooth, wireless, magnetic, Wi-Fi, near-field, radio, radio frequencies, radio frequency identification (RFID), other types of communication systems/protocols, or any combination thereof.

The images captured by the ACAS 200 may be combined together into a single combined image including the portions of the airplane 202 captured by each sensing device assembly. In some examples, the combination may be performed by coordinate transformation. A processing device, such as processing device 116 (FIG. 1), may receive one or both of the raw images of the fused images produced by the sensing device assemblies 204A, 204B and 204C. Based on one or both of the translational parameters and rotational parameters associated with each of the sensing device assemblies 204A, 204B and 204C, the processing device may adjust the images such that pixels of one sensing device assembly may be overlaid with pixels of another sensing device assembly that have an overlapping field of view. By performing the overlaying, the single combined image may be produced. In some examples, the translational parameters and the rotational parameters may be provided by one or more of a GPS 112 or an IMU 114 (FIG. 1).

Generating the single combined image may involve determining which pixels of the one or more sensing device assemblies 204A, 204B and 204C capture a certain point on the objects. The determination may involve comparing one or both of a distance associated with each pixel and a color associated with each pixel. For example, the processing device may identify that a pixel from the sensing device assembly 204A indicates a distance of five feet and a color white, identify that a pixel from the sensing device assembly 204B indicates a distance of five feet and a color white and, therefore, determine that the pixels captured the same point on an object. The processing device may then adjust the image from the sensing device assembly 204A and the image from the sensing device assembly 204B such that the pixels are overlaid.

In some examples, the process of generating the single combined image may include a preliminary step of determining, based on the locations of the sensing device assemblies 204A, 204B and 204C, which of the images produced by the sensing device assemblies 204A, 204B and 204C should overlap. If it is determined that the images produced by two sensing device assemblies should not overlap, the processing device may determine that the pixels are not associated with the same object.

In further examples, the process of generating the single combined image may include determining that a group of proximate pixels in an image produced by the first sensing device assembly 204A indicate both the same or substantially similar distances and colors of an image produced by the second sensing device assembly 204B before determining that the group of pixels should be overlaid to create the combined image. In response to determining that a pixel from the first sensing device assembly 204A indicates the substantially similar distance and color as a pixel from the second sensing device assembly 204B, the processing device may compare adjacent pixels in each image for similar distances and colors before determining the pixels are capturing the same object.

Additionally, the ACAS 200 may capture objects and scenery proximate to the airplane 202, such as object 230. The processing device may determine a distance between the airplane 202 and the object 230. Further, the processing device may determine distances between different objects captured by the sensing device assemblies 204A, 204B and 204C. The distance between the airplane 202 and the object 230 may be determined based on geometric principles. For example, the distance between the airplane 202 and the object 230 may be determined by using distances to the airplane 202 and the object 230 and angles of incidence to one of the sensing device assemblies to generate triangles for calculating the distance between the airplane 202 and the object 230.

Figure 3A:
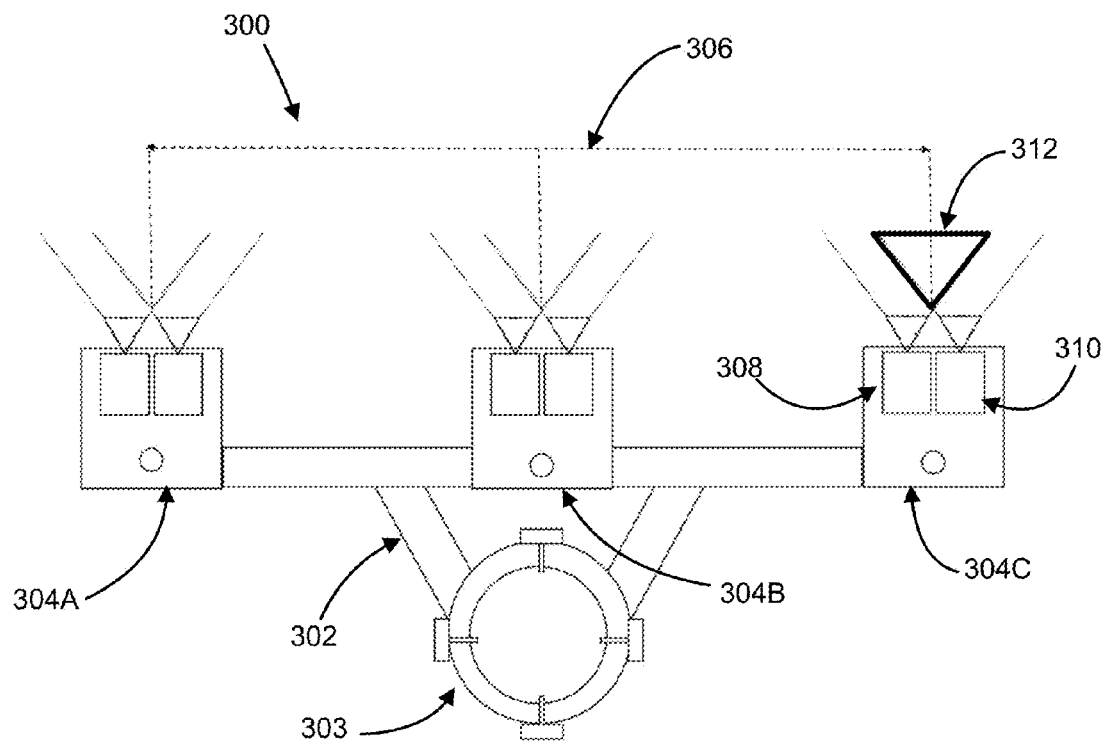
FIG. 3A illustrates a top view of an example mounting structure for an imaging assembly.

FIG. 3A illustrates a top view of an example mounting structure 302 of an imaging assembly 300. The mounting structure 302 may include an attachment mechanism 303. In this instance, the attachment mechanism 303 may be connected to a vertical member. However, it is to be understood that the attachment mechanism 303 may comprise any means of supporting the mounting structure or attaching the mounting structure to another object, such as by attaching to the object by fasteners, magnets, suction cups, adhesives, or any combination thereof.

The mounting structure 302 is illustrated as supporting three sensing device assemblies 304A, 304B and 304C, however more or fewer assemblies may be supported thereon. One or more of the sensing device assemblies 304A, 304B and 304C may include similar features as sensing device assemblies 204A, 204B and 204C (FIG. 2). In some examples, the sensing device assemblies 304A, 304B and 304C may be mounted in alignment substantially along a horizontal plane. The mounting structure 302 may include a shock dampened mechanical interface.

The sensing device assembly 304A and the sensing device assembly 304C may be separated by a distance 306. The mounting structure 302 may be constructed such that locations of the sensing device assembly 304A and the sensing device assembly 304C are varied or adjustable in a horizontal direction. For example, a user may adjust the sensing device assembly 304A to the left, providing a greater distance between the sensing device assembly 304A and the sensing device assembly 304C. Adjusting the distance between the sensing device assembly 304A and the sensing device assembly 304C may allow a user to capture different portions of an airplane and may allow the user to minimize a size of the mounting structure 302 for storage.

Each sensing device assembly 304A, 304B and 304C may include a first sensing device 308 and a second sensing device 310. First sensing device 308 and second sensing device 310 may capture overlapping field of view 312. The field of view 312 may be utilized to generate a fused image associated with sensing device assembly 304C. The fused image may be combined with fused images from sensing device assembly 304A and 304B to combine a combined image as discussed throughout this disclosure.

In some examples, each sensing device assembly 304A, 304B and 304C may include a single sensing device. Each single sensing device may capture images with pixels indicating distances to objects within a field of view. The images captured by the single sensing device may be combined and used for analysis as described throughout this disclosure.

In some examples, the mounting structure 302 may rotate such that the fields of view of the sensing device assemblies 304A, 304B and 304C rotate accordingly. The rotation may occur automatically or manually as performed by a user. In some examples, the mounting structure 302 may be automatically rotated based on a position of the airplane, such that the points fields of views of the sensing device assemblies 304A, 304B and 304C remain aimed at the airplane.

Figure 3B:
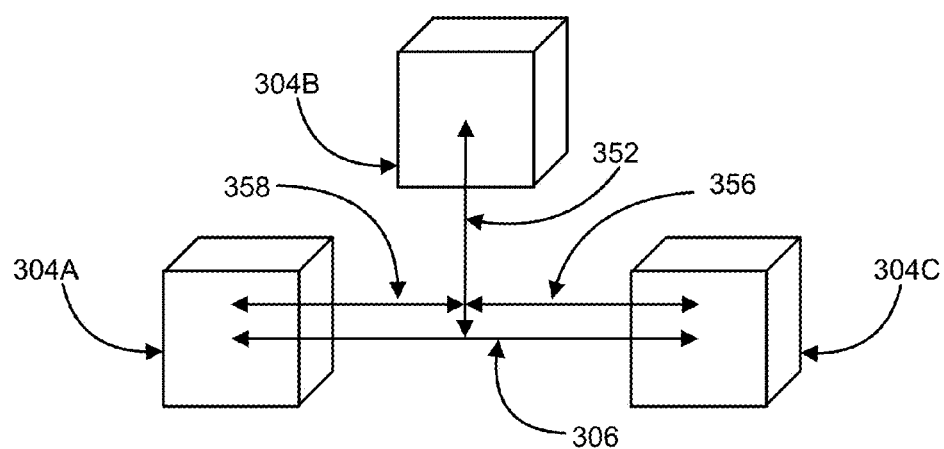
FIG. 3B illustrates a geometric view of the example imaging assembly of FIG. 3A.

FIG. 3B illustrates a geometric view of the example imaging assembly 300 of FIG. 3A. The sensing device assembly 304B may be located a distance 352 above both the sensing device assembly 304A and the sensing device assembly 304C. The mounting structure 302 (FIG. 3A) may be constructed such that the distance 352 is varied or adjustable. For example, a user may decide to increase the distance 352 such that the sensing device assembly 304B may capture a tail of an airplane by distance 352 being at least great enough to have a line of sight to the tail.

The sensing device assembly 304A and the sensing device assembly 304C may be a distance 358 and a distance 356, respectively, in the horizontal direction from sensing device assembly 304B. The distance 358 and the distance 356 may be adjusted by adjusting the mounting structure 302.

In some examples, the distances 352, 356, and 358 may be adjusted based on the size of the airplane. An ACAS utilizing the imaging assembly 300 may be configured to access an aircraft database containing characteristics for identifying a make of the airplane. The aircraft database may include instructions indicating where to locate a sensing device assembly and/or one or more sensing devices based on the make of the airplane. The mounting structure 302 (FIG. 3A) may be configured to adjust the locations, orientations, fields of view, spacing, and/or other operational parameters of the sensing devices based, at least in part, on the information provided by the database.

A processing device, such as processing device 116 (FIG. 1), used for combining images captured by one or more of the sensing device assemblies 304A, 304B and 304C may use one or more of the distances 352, 358, 356, and 306 when producing a combined image. Translational parameters of the sensing device assemblies 304A, 304B and 304C may be determined based on one or more of the distances 352, 358, 356, and 306 and may be used for overlaying the images.

One or more of the distances 352, 358, 356, and 306 may be determined through use of a GPS, such as GPS 112. In some examples, the mounting structure 302 may include sensors that determine the distances and transmit the distances to the processing device. Further, in some examples, the user may input the distances into a display the device, such as display device 118.

In some examples, the mounting structure 302 may rotate or may connected by the attachment mechanism 303 to an object, such as a pole, which rotates. Rotation of the mounting structure 302 may occur in response to a user request to change a scene captured by the sensing device assemblies. In other examples, the rotation of the mounting structure 302 may occur automatically such that a field of view of the sensing device assemblies follow the airplane as it moves relative the mounting structure 302.

In this instance, the mounting structure 302 has been discussed with three sensing device assemblies with a center sensing device assembly be located at a greater vertical height than the other sensing devices. It should be understood that the mounting structure 302 may support any number of sensing device assemblies and each of the sensing device assemblies may be located or adjustable to any location in the vertical and horizontal planes.

Figure 4:
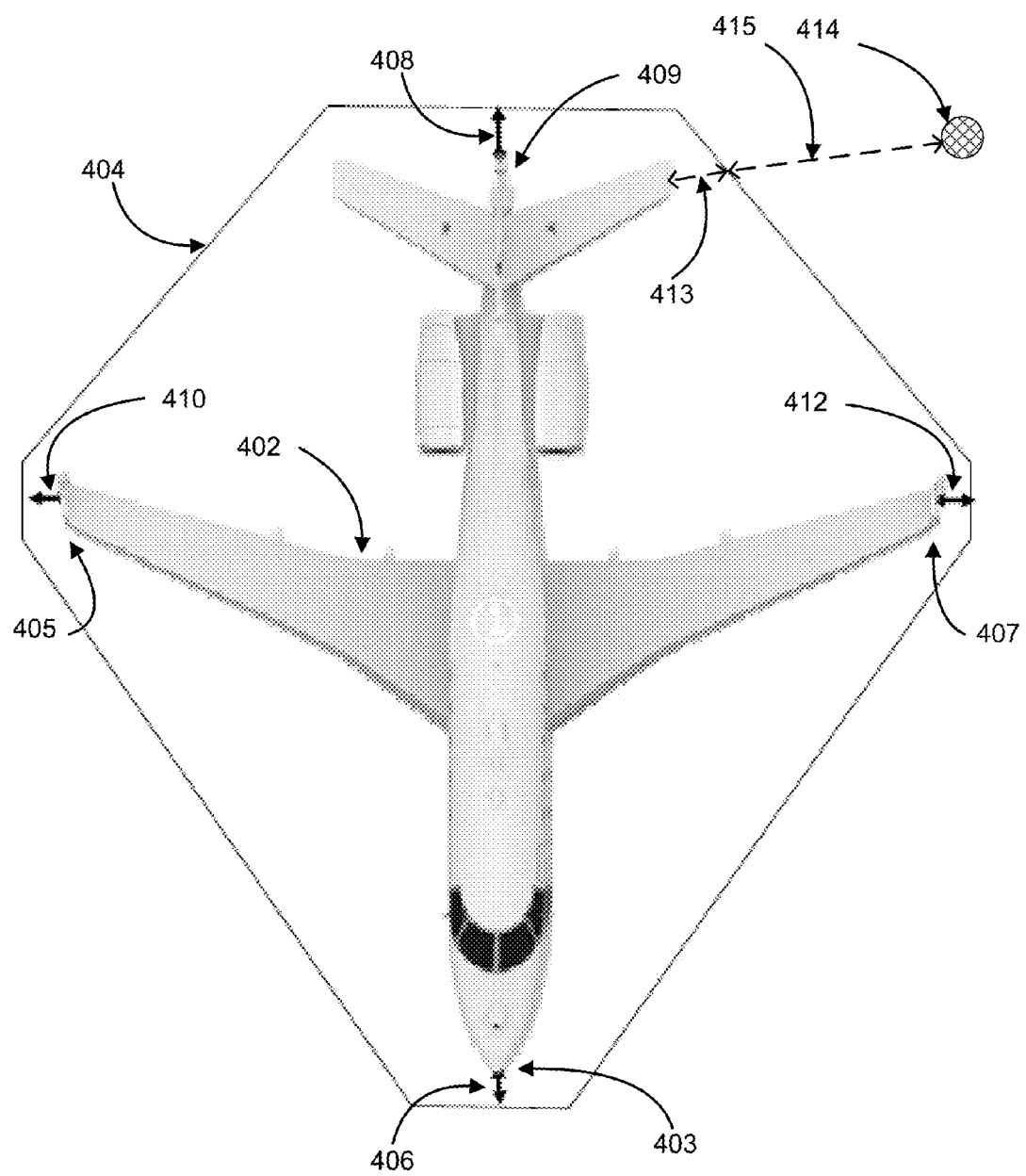
FIG. 4 illustrates an example bounding box encompassing an airplane.

FIG. 4 illustrates an example bounding box 404 encompassing an airplane 402. The bounding box 404 may encompass the airplane 402 on four sides of the airplane 402. In other examples, the bounding box 404 may additionally include the top and/or bottom of the airplane 402.

The bounding box 404 may be generated by a processing device, such as processing device 116 (FIG. 1). By processes disclosed throughout this description, the processing device may determine positions of one or more of a nose 403, a first wing tip 405, a second wing tip 407, and a tail 409 of the airplane 402. The processing device may generate the bounding box 404 based on one or more of the determined positions. For example, the processing device may use a combined image to determine the positions. In some examples, the processing device may use two different images captured by two different sensing device assemblies. It is to be understood that the processing device may identify any feature on the airplane 402 and that the bounding box 404 may be generated based on one or more of any of the features on the airplane 402.

The processing device may be configured to generate the bounding box 404 so that it is located a distance 406 from the nose 403, a distance 410 from the first wing tip 405, a distance 412 from the second wing tip 407, a distance 408 from the tail, or any combination thereof. The bounding distances may remain set irrespective of other variables, such as speed at which the airplane 402 is traveling or a direction of travel. In other examples, the bounding distances may be varied based on the speed at which the airplane 402 is traveling, such that the bounding distances increase when the speed of the airplane 402 increases. In some examples, the speed of the airplane 402 may be determined by an IMU, such as the IMU 114 (FIG. 1).

In some examples, the processing device may determine a make of the airplane 402 based on the positions of one or more of the features of the airplane 402. The processing device may access an aircraft database containing dimensional information for a plurality of makes of airplanes. The aircraft database may include a library of airplanes, airplane shapes, airplane fuselages, or any combination thereof. Based on the positions of one or more of the features, the processing device may determine the make of the airplane 402 and retrieve the dimensional information from the aircraft database. In some examples, the processing device may determine particular measurements of the airplane 402, such as length, width, height, or a combination thereof, based on the positions of the one or more features and may use the particular measurements to retrieve the dimensional information from the aircraft database.

The processing device may further orient, position, or both, the bounding box 404 based on positions of the one or more features of the airplane 402. For instance, the processing device may determine a location of the nose 403 of the airplane 402 and position the bounding box 404 based on the location of the nose 403. In some examples, the bounding box 404 may be oriented based on a position of both the nose 403 and the tail 409 of the airplane 402.

The processing device may further determine a distance 415 between the bounding box 404 and an object 414 proximate to the bounding box 404. The distance 415 may be determined by the described process of determining the distance between the airplane 202 and the object 230 of FIG. 2. In other examples, the processing device may determine coordinates associated with the edges of the bounding box 404 and may determine a distance to a location of the object 414. Further, the processing device may determine a distance 413 between the airplane 402 and the bounding box 404.

In some examples, the bounding box 404 may have a boundary along all or a portion of the exterior of the airplane 402. The distance 413 may be reduced to zero in these examples and, thereby, the distance 415 between the bounding box 404 and the object 414 may be equal to the distance from the airplane 402 and the object 414.

The processing device may additionally determine an amount of time until intersection between the bounding box 404 and the object 414 based on the speed of the airplane 404 and the location of the object 414. The amount of time may be used to determine the amount of time for the collision between the airplane 202 and the object 230 described in FIG. 2. In some examples, the aircraft database may include additional information such as a turning radius of the airplane 402, which may be used in determining if the intersection will occur and the amount of time until the intersection occurs.

In some examples, the size of the bounding box 404 may be set or revised based on the speed of the airplane 402. For example, as the speed of the airplane 402 increases, the size of the bounding box 404 may increase providing an operator of a vehicle towing the airplane 402 with more time to stop the airplane 402.

Figure 5:
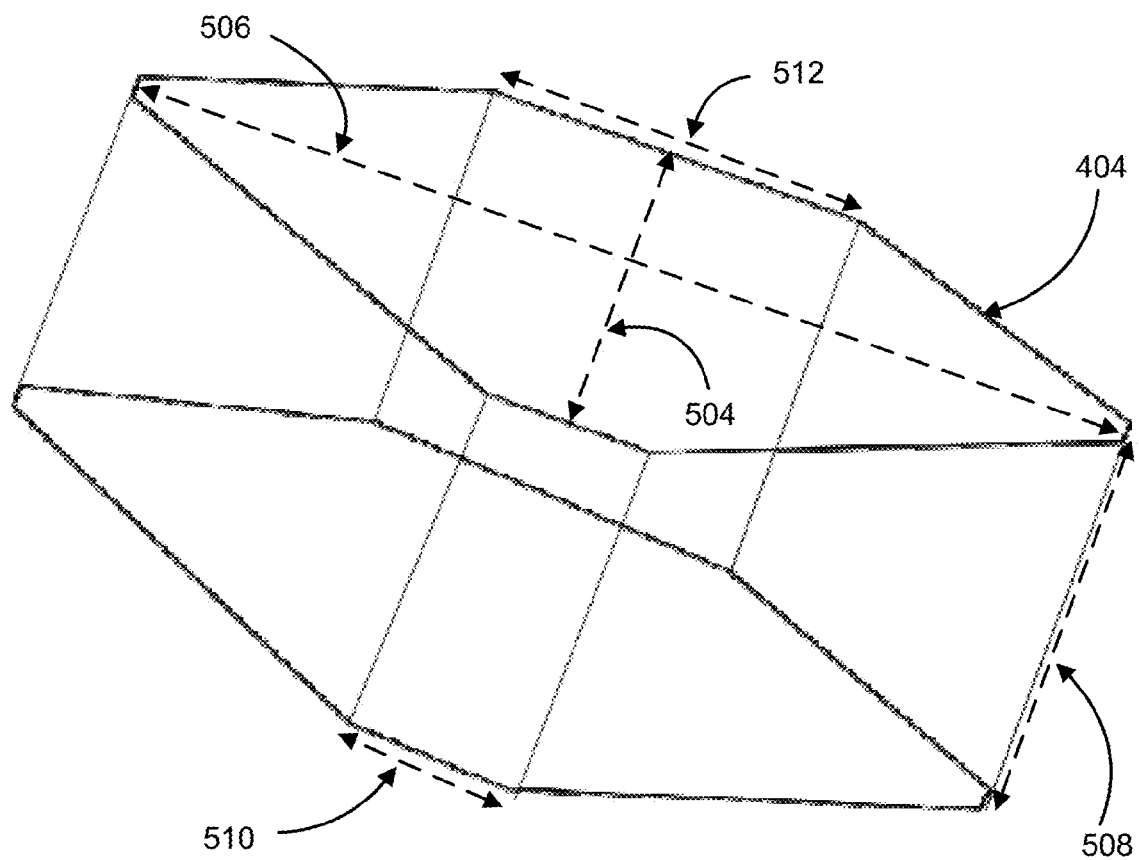
FIG. 5 illustrates a perspective view of the example bounding box of FIG. 4.

FIG. 5 illustrates a perspective view of the example bounding box 404 of FIG. 4. The bounding box 404 may be a three-dimensional shape. Dimensions of the bounding box 404 may be defined by one or more a length 504, a width 506, and a height 508. In some examples the length 504 may be set based on a length on an airplane as determined by a processing device, such as processing device 116 (FIG. 1). Similarly, the width 506 may be set based on a width on the airplane and the width 508 may be set based on a height on the airplane. The bounding box 404 may have a front width 510 greater than a width of the nose 403 of the airplane 402 (FIG. 4). Further, the bounding box 404 may have a rear width 512 greater than a width of the tail 409 of the airplane 402 (FIG. 4).

In this instance, although the bounding box 404 is illustrated having an octagonal shape, it is to be understood that the bounding box 404 may be any geometric shape. For example, different geometric shapes may be used to model different types of aircrafts, such as airplanes and helicopters.

Figure 6:
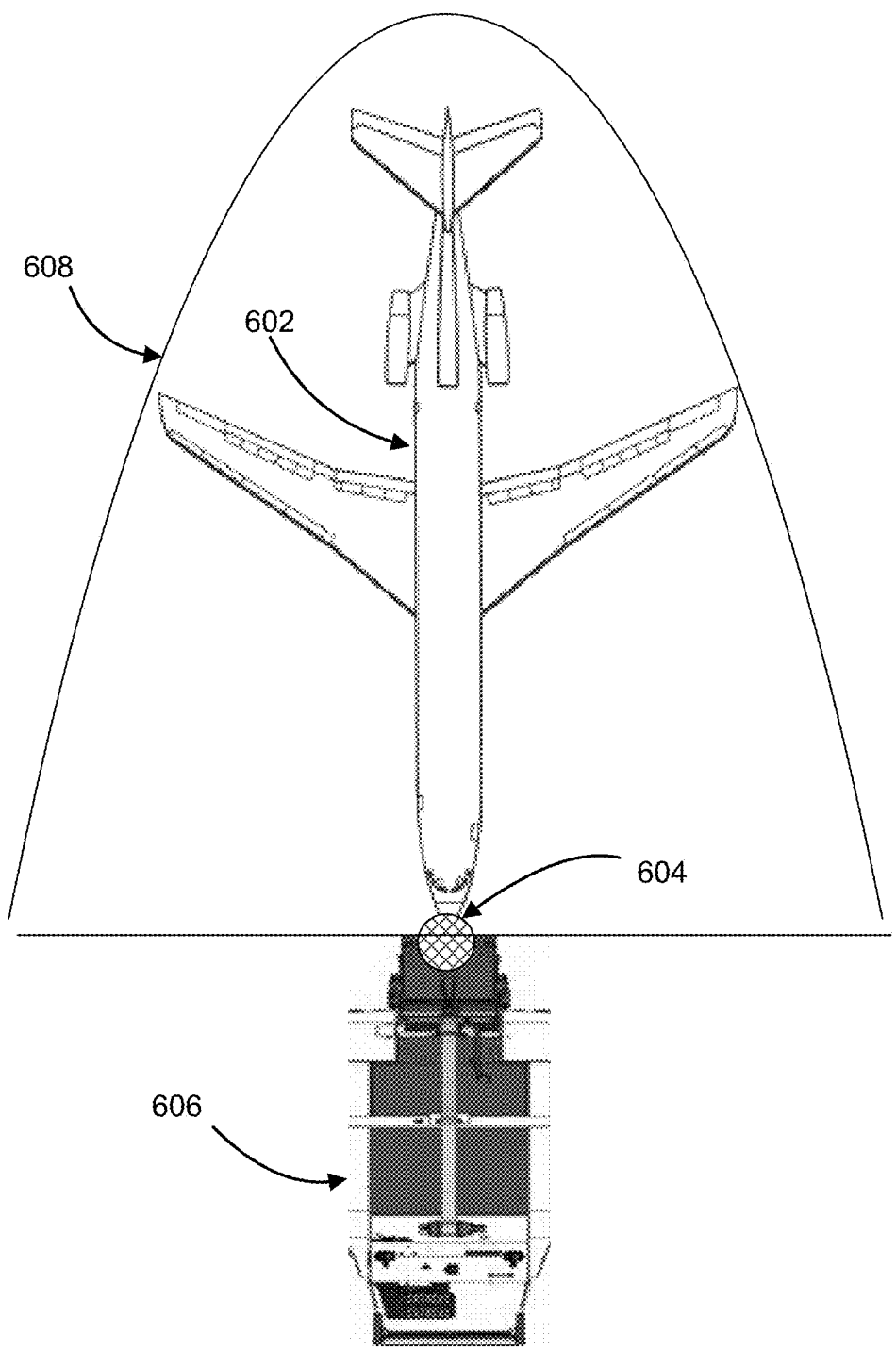
FIG. 6 illustrates an example ACAS mounted on a tug.

FIG. 6 illustrates an example ACAS 604 mounted on a tug 606. The ACAS 604 may operate similarly as one or more of the ACAS described throughout this disclosure and may perform some or all of the same functions. In this instance, the ACAS 604 may be mounted on a rear of the tug 606 and illustrated as being directed toward an airplane 602. The tug 606 is connected to the airplane 602 during a tugging operation.

The ACAS 604 may be mounted to the rear of the tug 606 or at any other location on the tug 606 and may be directed in other directions in addition to being directed toward the airplane 602. Further, in some examples, portions of the ACAS 604 may be located remote from the tug 606 and communicatively coupled to components located on the tug 606. For examples, a database, such as database 120 (FIG. 1), may be located at a separate location and information to be stored on the database may be transmitted wirelessly from a transmitter located on the tug 606.

Further, it is to be understood that the mounting of the ACAS 604 is not limited to being mounted to the tug 606. One or more of the components of the ACAS 604 may be mounted to any vehicle towing the airplane 602, any vehicle within a vicinity of the airplane 602, any fixed object within a vicinity of the airplane 602, on the airplane itself 602, or any combination thereof. For example, the ACAS 604 may be mounted to an airport building and directed toward a location where airplanes consistently travel.

The ACAS 604 is illustrated as having a field of view 608 encompassing the airplane 602. One or more sensing devices of the ACAS 604 may be arranged to change or increase the field of view 608 such that a larger or smaller area may be captured. Decreasing the field of view 608 to capture a smaller area may increase the precision of the captured image since each pixel in the captured image may be associated with a smaller area. The ACAS 604 may be configured to have a field of view 608 capturing a relatively larger area until the airplane 602 is identified, such that the ACAS 604 captures a larger portion of the airplane 602 for identifying the airplane 602. Once the airplane 602 has been identified, the ACAS 604 may decrease the area captured by the field of view 608 to increase precision of the image captured by the ACAS 604.

One or more portions of the airplane 602 may move out of the field of view 608 as the airplane 602 is moved and rotates relative to the tug 606. The ACAS 604 may be configured to maintain a virtual copy of the airplane 602 at the current location or a bounding box, such as bounding box 404 (FIG. 4), that is oriented to encompass the current location of the airplane 602. A processing device 604 may extrapolate from a previously captured image when a portion of the airplane 602 was captured to maintain the virtual copy or the bounding box based on an amount and direction of movement of the airplane 602 since the previously captured image was captured. In some examples, an IMU, such as the IMU 114 (FIG. 1), may provide additional information on the movement of the airplane 602. Any of the features described throughout this specification may operate with the virtual copy of the airplane 602.

In some examples, the ACAS 604 may be configured to rotate relative to the tug 606 in order to maintain the airplane 602 in the field of view 608. Portions of the ACAS capturing an image of the airplane 602 may be located on a mounting structure which rotates with the airplane 602, such as on a tow bar connected to the airplane 602 for towing. As the airplane 602 rotates relative to the tug 606, the entire mounting structure may rotate such that the field of view 608 remains focused on the airplane 602.

In other examples, the ACAS 604 may comprise a motorized rotational system so that one or more sensing devices may track the location of the airplane during a turn. The ACAS 604 may be located on a mounting structure by a mechanism configured to rotate one or more portions of the ACAS 604, such as a sensing device and/or camera. Additionally, the ACAS 604 may be configured to determine an angle of incidence between the airplane 602 and the tug 606. Based on the angle of incidence, the ACAS 604 may be configured to rotate the portions of the ACAS 604 to match the angle of incidence, thereby maintaining the airplane 602 within the field of view 608.

In some examples, the ACAS 604 may be configured to determine an angle of incidence of the airplane 602 relative to the tug 606 during movement of the airplane 602. As the angle increases, the ACAS 604 may be configured to increase the area within the field of view 608 to maintain the airplane 602 within the field of view 608. When the angle decreases, the ACAS 604 may be configured to reduce the area within the field of view 608 to be substantially a width of the airplane 602. By reducing the area within the field of view 608, the ACAS 604 may capture the airplane 602 with greater precision due to the pixels of the ACAS 604 capturing a smaller area.

Figure 7:
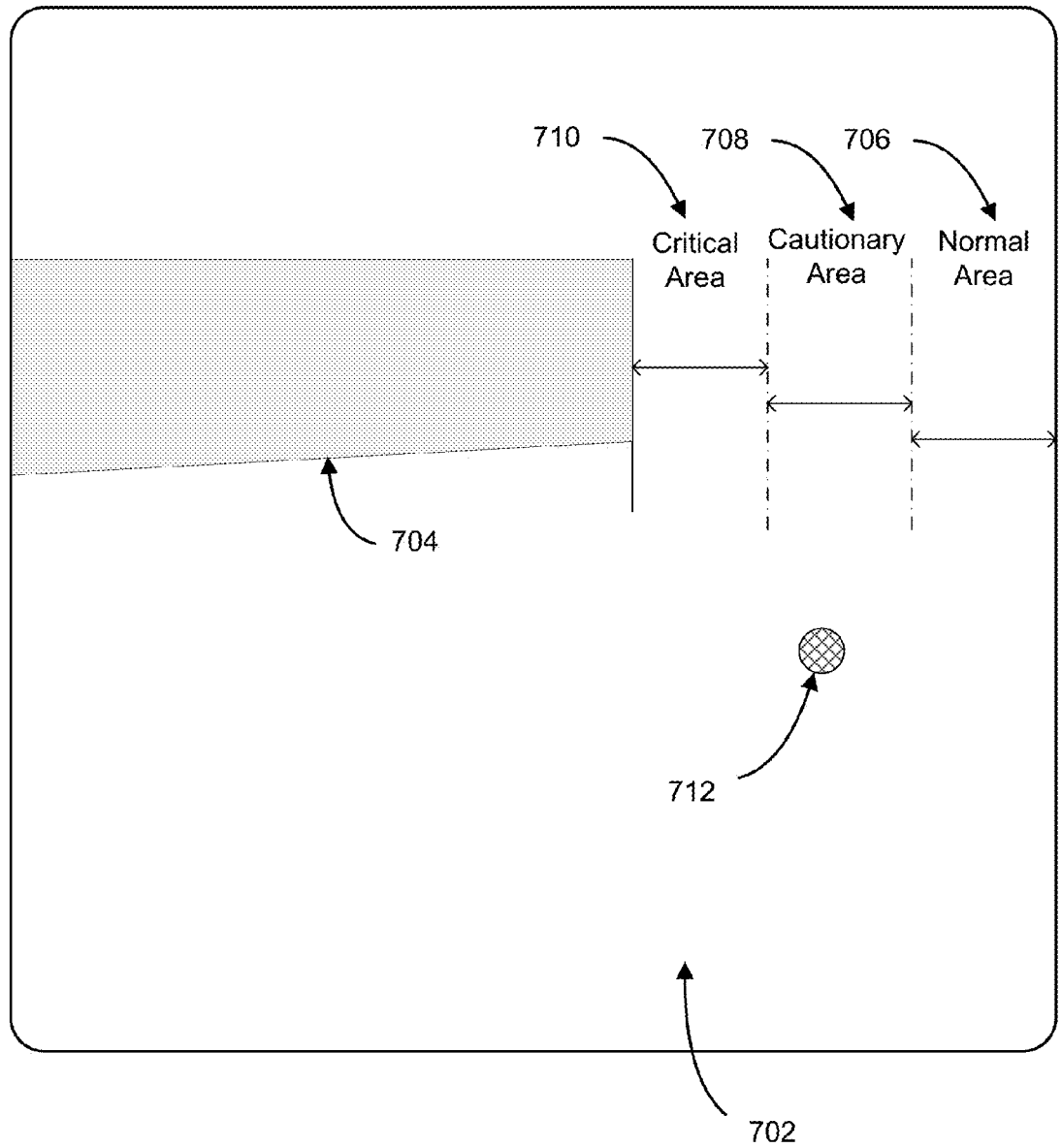
FIG. 7 illustrates an example display of an ACAS.

FIG. 7 illustrates an example display device 702 of an ACAS. The display device 702 may be configured to display a portion of one or more of a raw captured image, a fused image, a combined image, or a combination thereof, as described throughout this specification. A protected area 704 may be displayed on the image and may include one or both of a portion of an airplane and a portion of a bounding box.

The image displayed may include an object 712 located proximate to the protected area 704. The object 712 may be grouped into one of three areas depending on the object's 712 distance from the protected area 704: a normal area 706, a cautionary area 708, and a critical area 710.

The critical area 710 may be adjacent to the protected area 704 and extend a predetermined distance from the protected area 704. Objects in the critical area 710 may be of high importance due to a high probability of collision with the protected area 704. Objects that are within the critical area 710 may be displayed in a certain color to draw attention to the objects. For example, when object 712 is within the critical area 710, the object 712 may be displayed in the color red to indicate a high probability of collision between the object 712 and the protected area 704.

In some examples, in response to the object 712 being within the critical area 710, the display 702 may initiate a warning sound to draw attention to the object 712. The warning sound may be any sound that may capture a user's attention, such as a whistle sound, beeping, a buzzer sound, or a combination thereof. The warning sound may continue until object 712 exits the critical area 710 or until a user overrides the warning sound.

Further, in response to the object 712 being within the critical area 710, the ACAS may stop or prevent movement of the airplane indicated by the protected area 704. To resume normal movement, the object 710 may be removed from the critical area 710, or the movement of the airplane may be limited to reversing direction to return the airplane to a position prior to when the object 710 was located within the critical area 710. In some examples, a user override may be provided to override the stopping or prevention of movement function. In some other examples, the movement of the airplane may be limited to a maximum speed when the object 712 is within the critical area 710 rather than preventing movement of the airplane.

The cautionary area 708 may be adjacent to the critical area 710 and extend a predetermined distance from the critical area 710. Objects in the cautionary area 708 may be of medium importance due to a prospective possibility of collision with the protected area 704. Objects that are within the cautionary area may be displayed in a second color to draw attention to the objects. For examples, when object 712 is within the cautionary area, the object 712 may be displayed in the color yellow to indicate a prospective possibility of collision between the object 712 and the protected area 704.

In some examples, in response to the object 712 being in the cautionary area 708, the display 702 may initiate a warning sound to draw attention to the object 712. The warning sound initiated when the object 712 is within the cautionary area 708 may be different than the warning sound initiated when the object 712 is within the critical area 710. In other examples, the warning sound initiated when the object 712 is within the cautionary area 708 may be the same warning sound as initiated when the object 712 is within the critical area 710, but may be a different intensity. For example, the warning sound for the critical area 710 and the cautionary area 708 may be a beeping sound, although the beeping is at a slower rate when the object 712 is within the cautionary area 708 than when it is in within the critical area 710.

In some examples, in response to the object 712 being within the cautionary area 708, the ASAC may limit the movement of the airplane to a maximum speed. A user override may be provided allowing a user to override the limitation to the movement of the airplane.

The normal area 706 may be adjacent to the cautionary area 708 and may extend from the cautionary area. Objects within the normal area may be displayed in the object's captured color or in a third color indicating that there is limited imminent threat of collision between the object 712 and the protected area 704.

In some examples, sizes of one or both of the critical area 710 and the cautionary area 708 may be increased or decreased based on a speed at which the airplane is traveling. For example, when the airplane is traveling at relatively high speeds, the size of one or both of the critical area 710 and the cautionary area 708 may increase in response.

In some examples, the display device 702 may be configured to display one or both of a speed at which the airplane is traveling and a distance to between the protected area 704 and the object 712. Where the airplane is on a collision course with the object 712, the display 702 may further display an amount of time until the protected area 704 and the object 712 will collide.

In this instance, three areas are discussed located around the protected area 704. It is to be understood that other examples include more or less areas are located around the protected area 704. For example, an example may include the critical area 710 and the normal area 706, but may omit the cautionary area 708.

Figure 8:
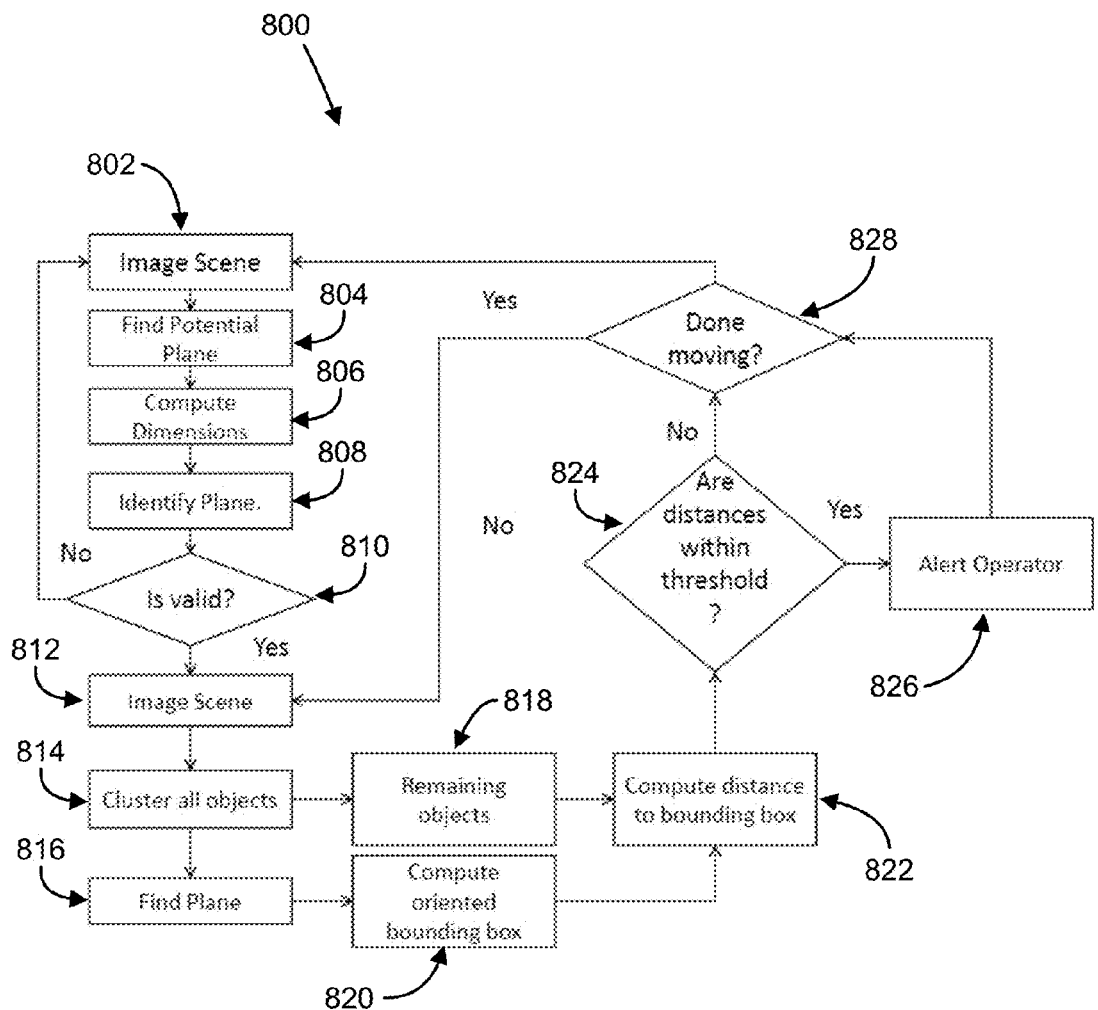
FIG. 8 illustrates an example process of an ACAS process.

FIG. 8 illustrates an example process 800 of an ACAS. In step 802, the ACAS captures one or more images of a scene. One or more sensing device assemblies, such as sensing device assembly 204A, may be utilized to capture the images. Imaging the scene may further comprise the process of generating one or more fused images, one or more combined images, or any combination thereof, as described throughout this application.

In step 804, the ACAS determines one or more potential airplanes in the images of the scene. Finding the potential airplanes may include analyzing pixels of the images to determine one or more groups of pixels that, when combined, indicate a shape and/or color that is similar to what would be expected for an airplane. In some examples, the ACAS may analyze distances from the sensing device assemblies to determine a shape of the potential airplanes and other objects within the scene.

In step 806, the ACAS computes dimensions of the potential airplanes. The dimensions may be calculated by identifying certain features on the potential airplanes and deriving the dimensions on the positions of the certain features. For example, the ACAS may identify a nose and a tail of a potential airplane and derive the length of the potential airplane based on a distance between the nose and the tail.

In step 808, the ACAS may identify the airplane. Based on the dimensions from the potential airplanes, the ACAS may identify an expected shape of the airplane, including extrapolating to create a model of the airplane which includes portions of the airplane that may not have been captured by the images. In some examples, the ACAS may further identify a make of the airplane based on the dimensions from the potential airplanes, which may be accessed from an aircraft database.

In some examples, the process 800 may include step 810 of validating the identity of the airplane. The ACAS may display to a user one or both of the airplane model and the airplane make that have been identified by the ACAS and ask for verification that the model and/or make is correct. If the user indicates that the identified model and/or make are valid, the ASAC stores the identified model and/or make. If the user indicates that the identified make is invalid, the process 800 may loop back to step 802.

In some examples where multiple potential airplane makes are identified, the ACAS may present the user with a list of the multiple potential airplane makes and request selection of one of the makes from the user or a selection that none of the models presented are valid. The user may select a single airplane make from the list to be stored by the ACAS.

In some examples, the ACAS may display a prompt to the user for entry of the airplane make or dimensions to generate an airplane model. In further examples, the prompt may be displayed when the ACAS did not receive enough information from the captured images to find the potential airplane or identify the airplane. In response to receiving the user input to the prompt, the ACAS may determine dimensions or further dimensions of the airplane based on the user input.

In other examples, the process 800 may omit step 810. In this instance, the ACAS may have derived enough information from the images to identify the airplane without user input.

In step 812, the ACAS may again image the scene to capture any changes to the scene that may have occurred between the imaging of the scene in step 802 and the identification or validation of the airplane.

In step 814, the ACAS may cluster objects in the scene that are separate from the airplane. The process of clustering the objects may involve analyzing the pixels captured by the images to determine similarities between pixels located in a portion of the image. For example, the ACAS may identify that a group of pixels in the lower left portion of the image indicate one or more of a color and a distance which are similar. Based on the pixels in the groups having a similar color and/or a similar distance, the ACAS may group the pixels together as a single object. The ACAS may further determine that one or a few of the pixels in a group is an outlier and not take into account the pixel's indicated color or distance.

In step 816, the ACAS may find the airplane. The process of finding the airplane may involve locating one or more of the features and the portions of the airplane and overlaying the generated airplane model over where the airplane is expected to be located based on the one or more of the features and portions. In some examples, step 816 may be performed in parallel with step 814.

In step 818, the ACAS may identify the remaining objects that were not clustered and were not the airplane. The remaining objects may be an object that is captured by a single pixel of the image or a few pixels that the ACAS determines are not large enough for grouping.

Further, the ASAC may determine that some of the pixels that capture outlying data should be excluded from both the clustered objects and the remaining objects. The ASAC may further determine that some of the clustered objects and the remaining objects should not be included when performing further analysis of the images. For example, if a portion of the pixels indicate that an object is closer to the sensing device assemblies than would be likely, the object may be determined to be a fly that landed on one of the sensing device assemblies and should be excluded from analysis.

In step 820, the ACAS may compute and determine an orientation of a bounding box by any of the methods described throughout this disclosure. Based on one or both of the computation and the orientation, the ACAS may generate the bounding box. In some examples, step 820 may be performed in parallel with step 818.

In step 822, the ACAS may compute distances between one or more of the clustered objects and the bounding box. Further, the ACAS may calculate distances between one or more of the remaining objects and the bounding box either in lieu of or in addition to calculating the distances between the clustered objects and the bounding box.

In some examples, the ACAS may compute the distances relative to the airplane rather than the bounding box. For example, distances between the clustered objects and the airplane may be calculated. Further, some examples may compute the distances between the objects and the airplane and also compute the distances between the objects and the bounding box.

In step 824, the ACAS determines whether the computed distances indicate that an object is within a threshold distance of the airplane or the bounding box, depending the ACAS. If the ACAS determines that the object is within the threshold distance, the process 800 continues to step 826, where one or both of the user and an operator are alerted. The alert may include any of the warning features discussed in this disclosure, including the warning sounds discussed relating to the critical area 710 and the cautionary area 708 (FIG. 7).

In step 828, the ACAS may determine whether the airplane is still moving. Determining whether the airplane is still moving may be based on a speed of the airplane, which may be obtained by an IMU, such as the IMU 114 (FIG. 1). In the case the airplane has stopped moving, the process 800 may return to step 802. The process 800 may continue at step 802 with new images captured at a later time period than the images analyzed the first time step 802 was performed. In some examples, the ACAS may capture new images of the scene at time intervals and perform the process 800 on the new images as they are captured. In some examples, the new images may be captured every half a second.

In the instance that the ACAS determines that the airplane is still moving, the process 800 may continue to step 812. Step 812 may continue by processing the new images as disclosed above. The process will then continue through steps 814 to 828 with the new images.

Figure 9A:
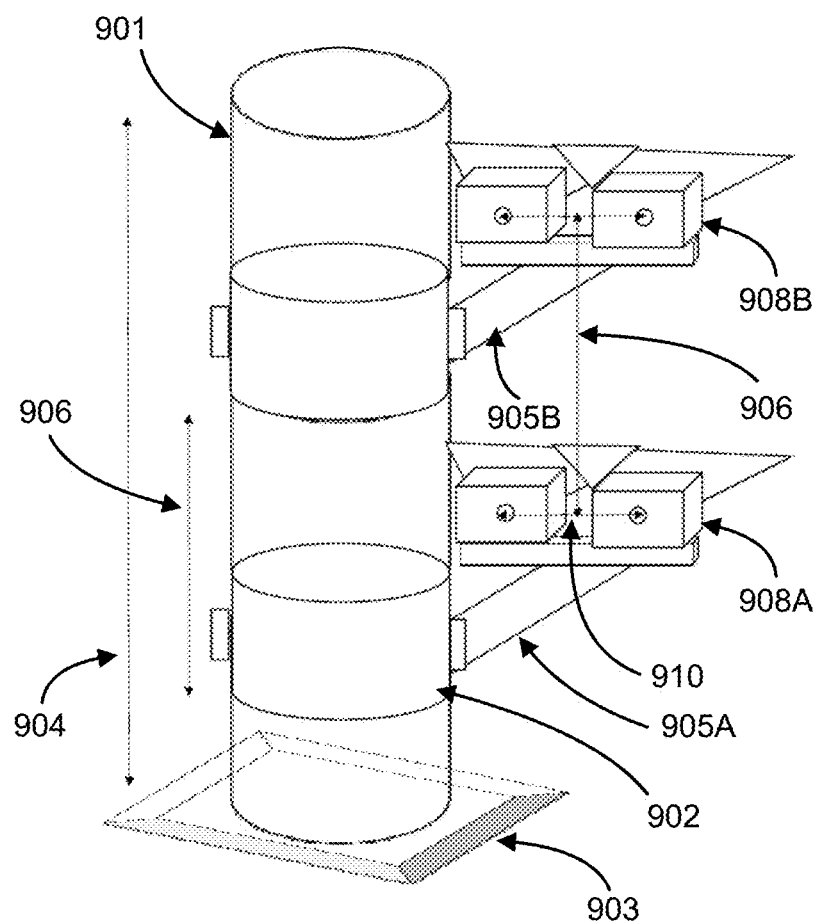
FIG. 9A illustrates another example mounting structure for an imaging assembly.

FIG. 9A illustrates another example mounting structure 902 for an imaging assembly 900. The mounting structure may include a vertical member 901 mounted on a base 903. The vertical member 901 may extend to a distance 904 above the base 903. Base 903 may support the vertical member 901 on a surface and may be attached to the surface by an attachment means, such as fasteners, magnets, suction cups, adhesives, or any combination thereof.

Two assembly supports 905A and 905B may be attached to the vertical member 901 and may support sensing device assemblies 908A and 908B. The assembly supports 905A and 905B may be attached to the vertical member 901 at a distance 906 of separation. The assembly supports 905A and 905B may extend parallel to each other such that the sensing device assembly 908A and the sensing device assembly 908B are separated by the distance 906.

The sensing device assembly 908A and the sensing device assembly 908B may be aligned at along a vertical plane. In some examples, the assembly supports 905A and 905B may be adjusted such that the sensing device assemblies 908A and 908B are on different vertical planes. Further, the vertical member 901 may rotate causing the fields of views of the sensing device assemblies 908A and 908B to rotate accordingly. The vertical member 901 may be rotated automatically or manually such that one or both of the sensing device assemblies 908A and 908B captures an airplane as it moves.

Figure 9B:
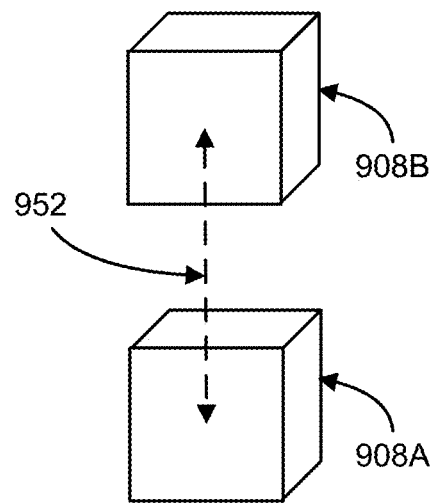
FIG. 9B illustrates a geometric view of the example imaging assembly of FIG. 9A.

FIG. 9B illustrates a geometric view of the example imaging assembly of FIG. 9A. The sensing device assembly 908B may be located at a distance 952 above the sensing device assembly 908A. The distance 952 may be varied or adjusted based on a positions of the assembly supports 905A and 905B. As discussed, in regards to FIG. 3A and FIG. 3B, a processing device may determine the distance 952 and utilize the distance 952 for generating a combined image from the images captured by sensing device assemblies 908A and 908B by any of the processes of combining images described throughout the disclosure.

In this instance, the mounting structure 902 includes two sensing device assemblies 908A and 908B. It should be understood that in other examples the mounting structure 902 may contain more or fewer sensing device assemblies. Further the positions of the sensing device assemblies may be varied in one or both of the vertical direction and the horizontal direction.

Figure 10A:
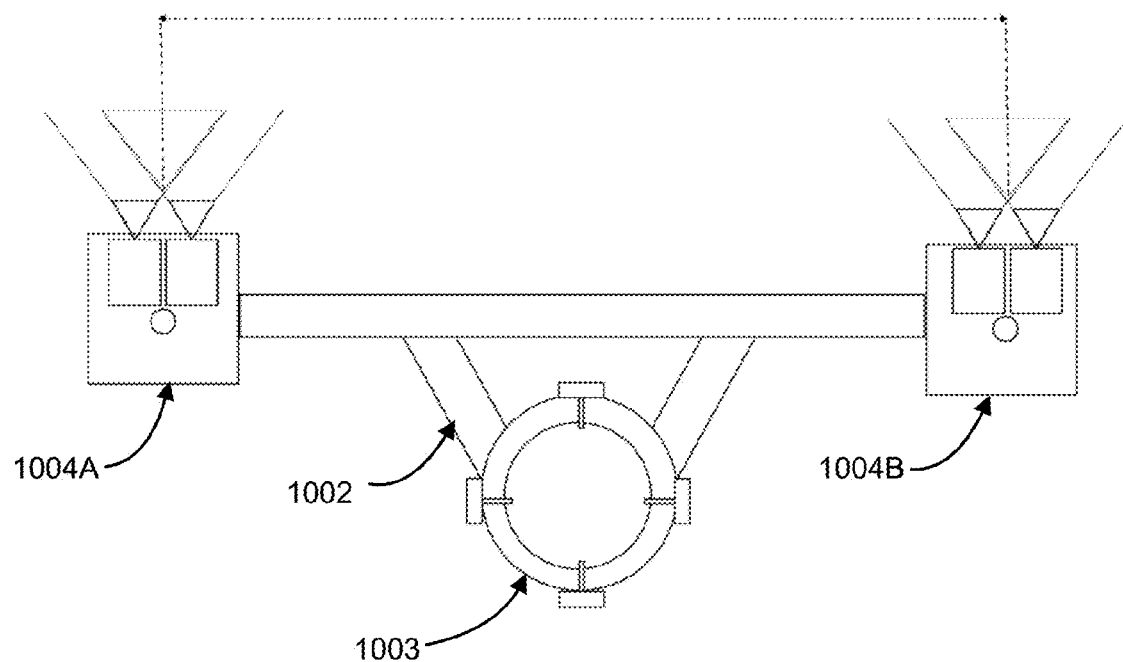
FIG. 10A illustrates another example mounting structure for an imaging assembly.

FIG. 10A illustrates another example mounting structure 1002 for an imaging assembly 1000. Mounting structure 1002 may include two sensing device assemblies 1004A and 1004B aligned along a horizontal plane. The sensing device assemblies 1004A and 1004B may include one or more of the features of the sensing device assemblies 204A, 204B and 204C of FIG. 2. The mounting structure 1002 may include an attachment mechanism that includes one or more of the features of the attachment mechanism 303 of FIG. 3A and FIG. 3B. Mounting structure 1002 may further include one or more of the features of the mounting structure 302 of FIG. 3A and FIG. 3B.

Figure 10B:
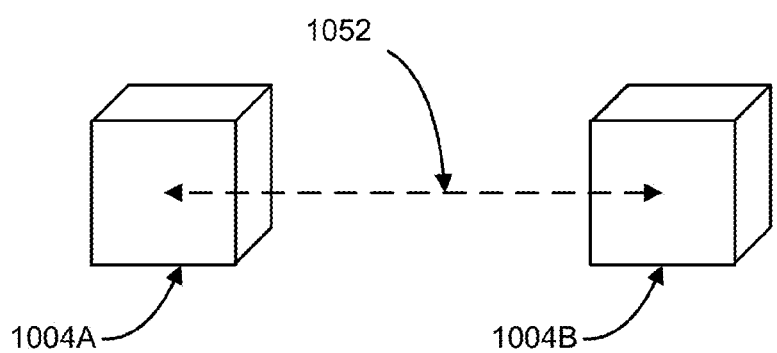
FIG. 10B illustrates a geometric view of the example imaging assembly of FIG. 10A.

FIG. 10B illustrates a geometric view of the example imaging assembly 1000 of FIG. 10A. The sensing device assembly 1004A may be located at a distance 1052 to a left of the sensing device assembly 1004B. The distance 1052 may be varied or adjusted by the same process as varying and adjusting the distance 306 as described in referring to FIG. 3A and FIG. 3B. As discussed, in regards to FIG. 3A and FIG. 3B, a processing device may determine the distance 1052 and utilize the distance 1052 for generating a combined image from the images captured by sensing device assemblies 1004A and 1004B by any of the processes of combining images described throughout the disclosure.

In this instance, the mounting structure 1002 includes two sensing device assemblies 1004A and 1004B. It should be understood that in other examples the mounting structure 1002 may contain more or fewer sensing device assemblies. Further the positions of the sensing device assemblies may be varied in one or both of the vertical direction and the horizontal direction.

Figure 11:
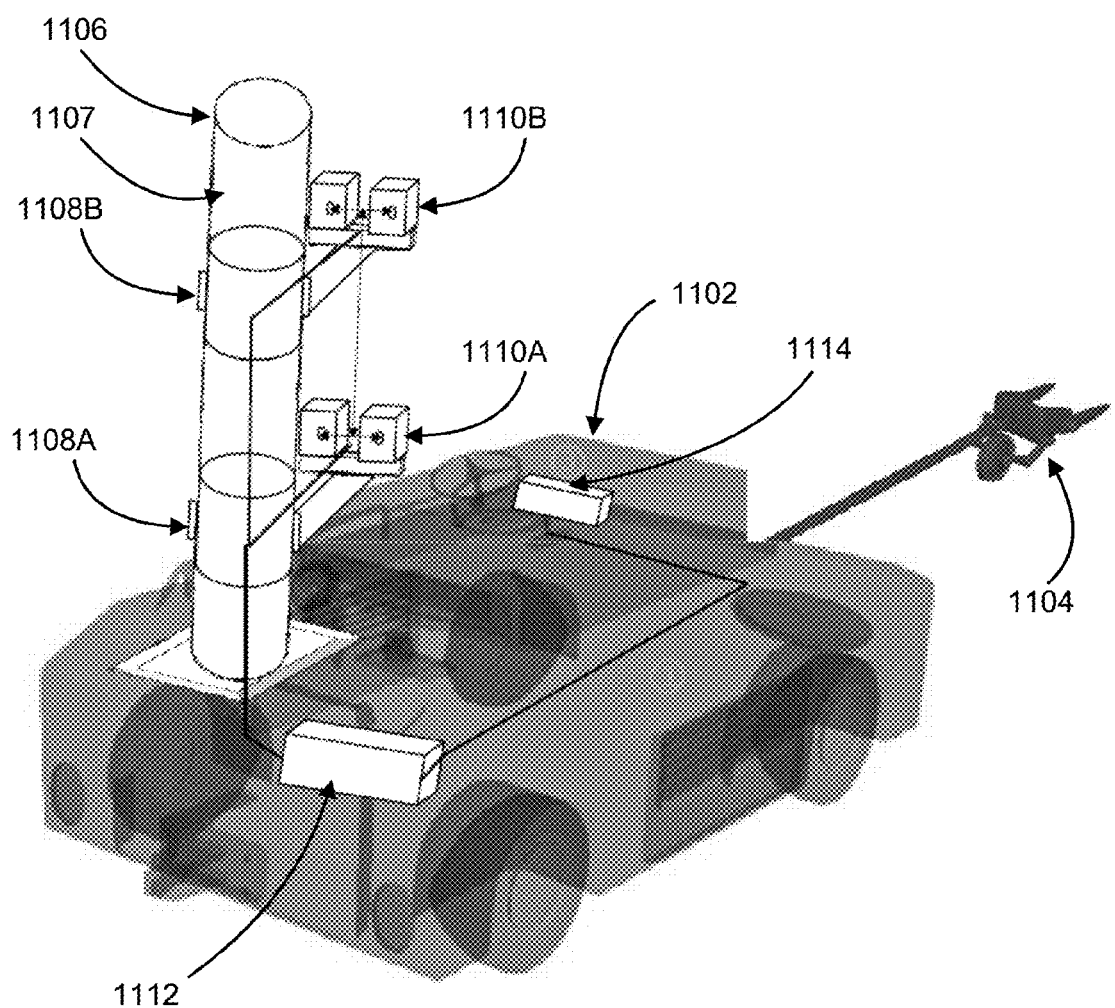
FIG. 11 illustrates a tug mounted with an example ACAS.

FIG. 11 illustrates a tug 1102 mounted with an example ACAS. The tug 1102 may include a tow bar 1104 for attaching the tug 1102 to an airplane during a towing operation. The tow bar 1104 may extend from a front of the tug 1102. A user and/or driver may be oriented towards the front of the tug 1102 when towing the airplane.

The ACAS may include two sensing device assemblies 1110A and 1110B supported on the tug 1102 by a mounting structure 1106. The sensing device assemblies 1110A and 1110B may be oriented toward the front of the tug 1102 such that the sensing device assemblies 1110A and 1110B are facing the airplane when under tow. In some examples, one or both of the sensing device assemblies 1110A and 1110B may be automatically or manually rotated to face directions other than the front of the tug 1102. The sensing device assemblies 1110A and 1110B may include one or more of the features of sensing device assemblies 204A, 204B and 204C (FIG. 2)

The mounting structure 1106 may maintain a distance 1107 between the sensing device assembly 1110A and the sensing device assembly 1110B. The mounting structure 1106 may include two assembly attachments 1108A and 1108B supporting sensing device assemblies 1110A and 1110B, respectively. One or both of the assembly attachments may be adjustable to different heights along a vertical member 1107 of mounting structure 1106, thereby changing heights of the sensing device assemblies 1110A and 1110B. In some examples, vertical member 1106 may be configured to extend or retract to change the heights of the sensing device assemblies 1110A and 1110B in lieu of, or in addition to, the assembly attachments 1108A and 1108B.

A processing unit 1112 of the ACAS assembly may be located inside of or on the tug 1102. The processing unit 1112 may include one or more of the GPS 112 (FIG. 1), the IMU 114 (FIG. 1), the processing device 116 (FIG. 1), the database 120 (FIG. 1), or any combination thereof, or may include one or more of the features of these components. The processing unit 1112 may be communicatively coupled to the sensing device assemblies 1110A and 1110B and perform one or more of the features described throughout this disclosure using raw images, fused images, combined images, or any combination thereof received from the sensing device assemblies 1110A and 1110B.

The processing unit 1112 may be wirelessly-enabled to communicate with other devices and systems using Bluetooth, wireless, magnetic, Wi-Fi, near-field, radio, radio frequencies, radio frequency identification (RFID), other types of communication systems/protocols, or any combination thereof. The processing unit 1112 may be communicatively coupled with an aircraft database, such as the aircraft databases described throughout this disclosure. In some examples, the processing unit 1112 may be coupled to a database, such as database 120 (FIG. 1), for storing any of the data or information produced by the processing unit 1112.

The ACAS may include a display 1114, which may include one or more of the features of display device 118 (FIG. 1) and display 702 (FIG. 7). The display device 1114 may be located in a control panel located in front of an operator. The display device 1114 may display any of the information produced by the processing unit 1112.

Figure 12:
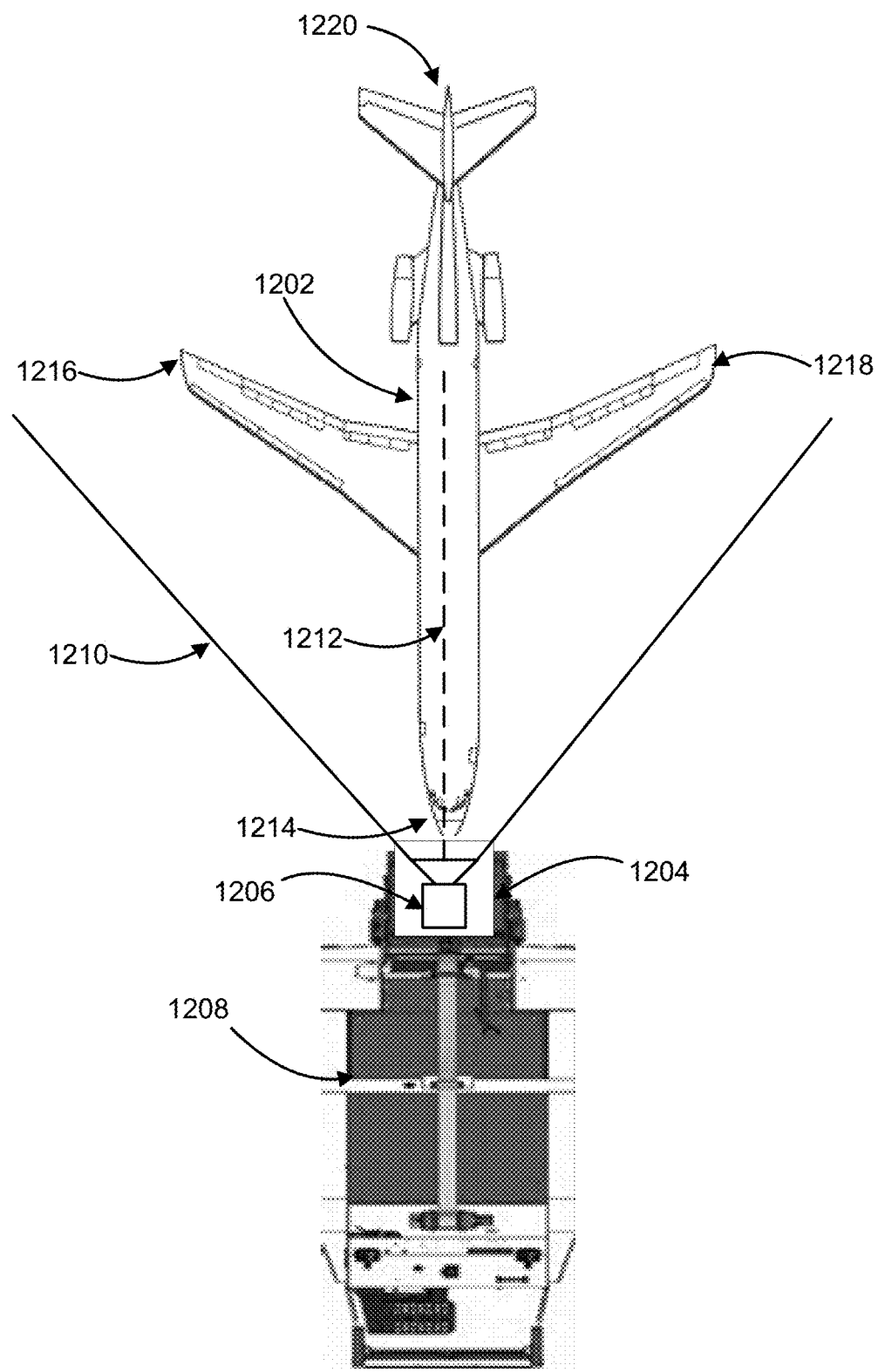
FIG. 12 illustrates an example ACAS mounted on a tug with an airplane located directly behind the tug.

FIG. 12 illustrates an example ACAS 1204 mounted on a tug 1208 with an airplane 1202 located directly behind the tug 1208. The ACAS 1204 may include a sensing device 1206 directed toward the airplane 1202. The sensing device 1206 may have a field of view 1210 greater than the width of the airplane 1202 with a midpoint 1212 of the field of view 1210 aligned along the fuselage 1203 of the airplane 1202. In this example, one or more of a nose 1214, a first wing 1216, a second wing 1218, and a tail may be located within the field of view 1210 of the sensing device 1206.

Figure 13:
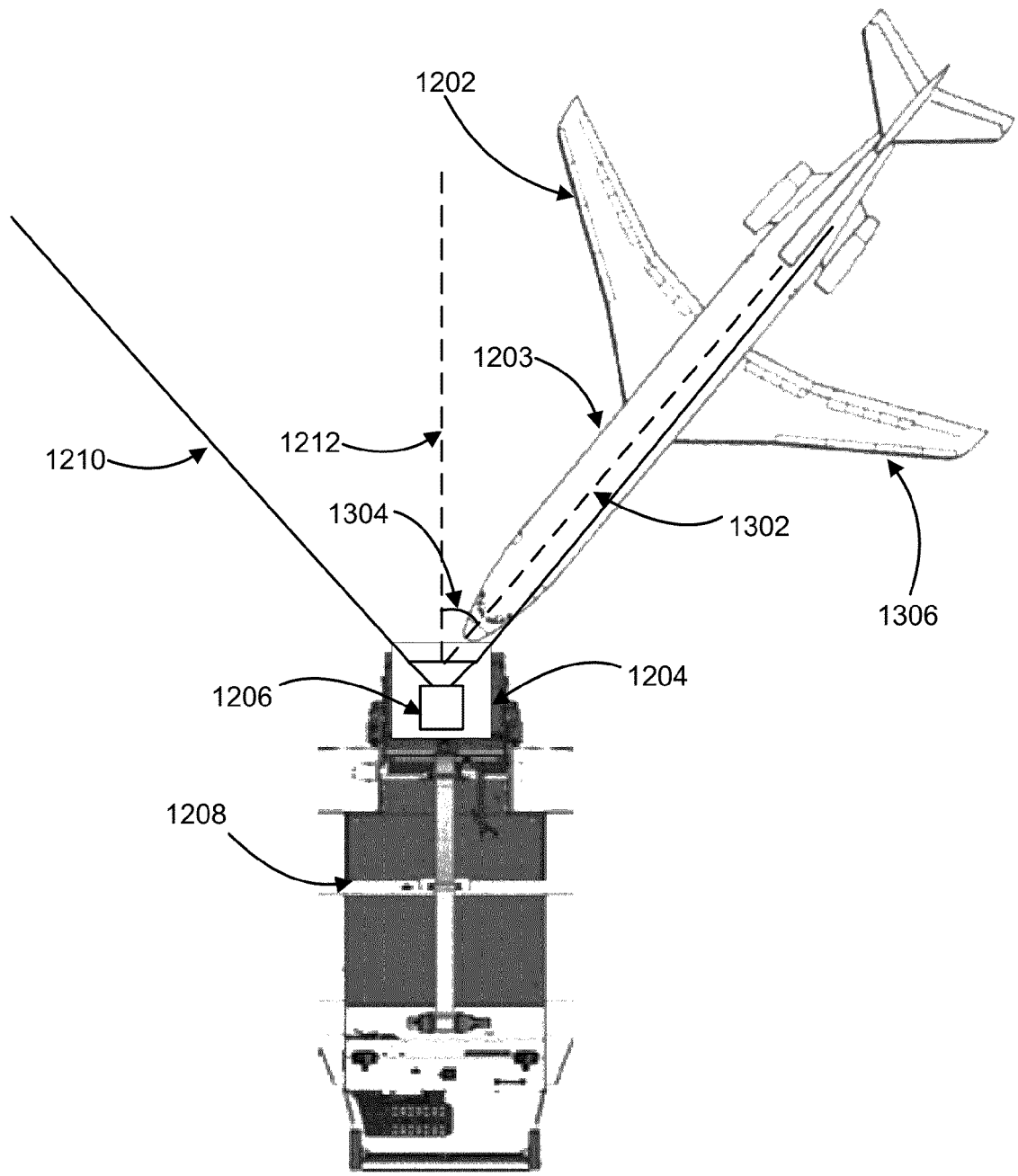
FIG. 13 illustrates the example ACAS of FIG. 12 with the airplane located at an angle to the tug.

FIG. 13 illustrates the example ACAS 1204 of FIG. 12 with the airplane 1202 located at an angle to the tug 1208. As the tug 1208 tows the airplane 1202, the angle of the airplane 1202 to tug 1208 may change. As the angle changes, a portion 1306 of the airplane 1202 may be located outside of the field of view 1210 of the sensing device 1206.

When the airplane 1202 is located at an angle to the tug 1208 and the sensing device 1206 remains aimed directly back from the tug 1208, the fuselage 1203 may be aligned along a reference line 1302. An angle of incidence 1304 may exist between the reference line 1302 and the midpoint 1212 of the field of view 1210 intersect.

Figure 14:
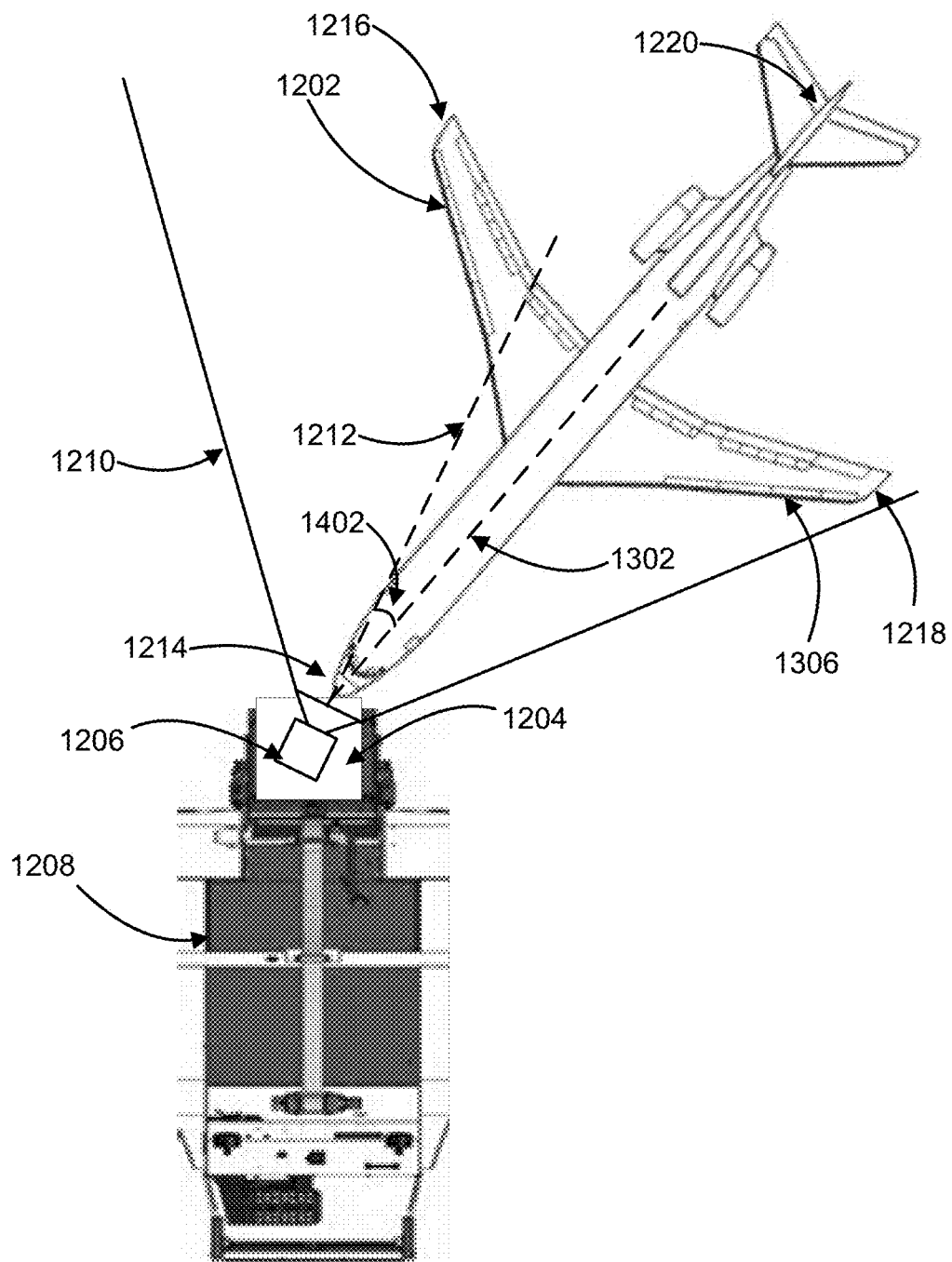
FIG. 14 illustrates the example ACAS of FIG. 12 with the sensing device rotated.

FIG. 14 illustrates the example ACAS 1204 of FIG. 12 with the sensing device 1206 rotated to maintain a view of the airplane 1202. In response to determining that the portion 1306 of the airplane 1202 exits the field of view 1210, the sensing device 1206 may be configured to rotate to maintain the portion 1306 within the field of view 1210. In some examples, a mounting device on which the sensing device 1206 is mounted may rotate with the sensing device 1206.

In some examples, the rotation of the sensing device 1206 may occur in response to the ACAS 1204 determining that an angle 1402 between the midpoint 1212 of the field of view 1302 and the reference line 1302 is greater than a predetermined angle. The predetermined angle may be based on distances between one or more points on the airplane 1202, including the nose 1216, the first wing 1216, the second wing tip 1218, the tail 1220, or any combination thereof.

In some examples where a make of the airplane 1202 is determined, the predetermined angle may be based on the make of the airplane 1202. The ACAS 1204 may determine the predetermined angle based on dimensional information retrieved from an aircraft database used to identify the make of the airplane 1202. In some examples, the ACAS 1204 may include a database having predetermined angles associated with a plurality of different makes of airplanes.

Figure 15:
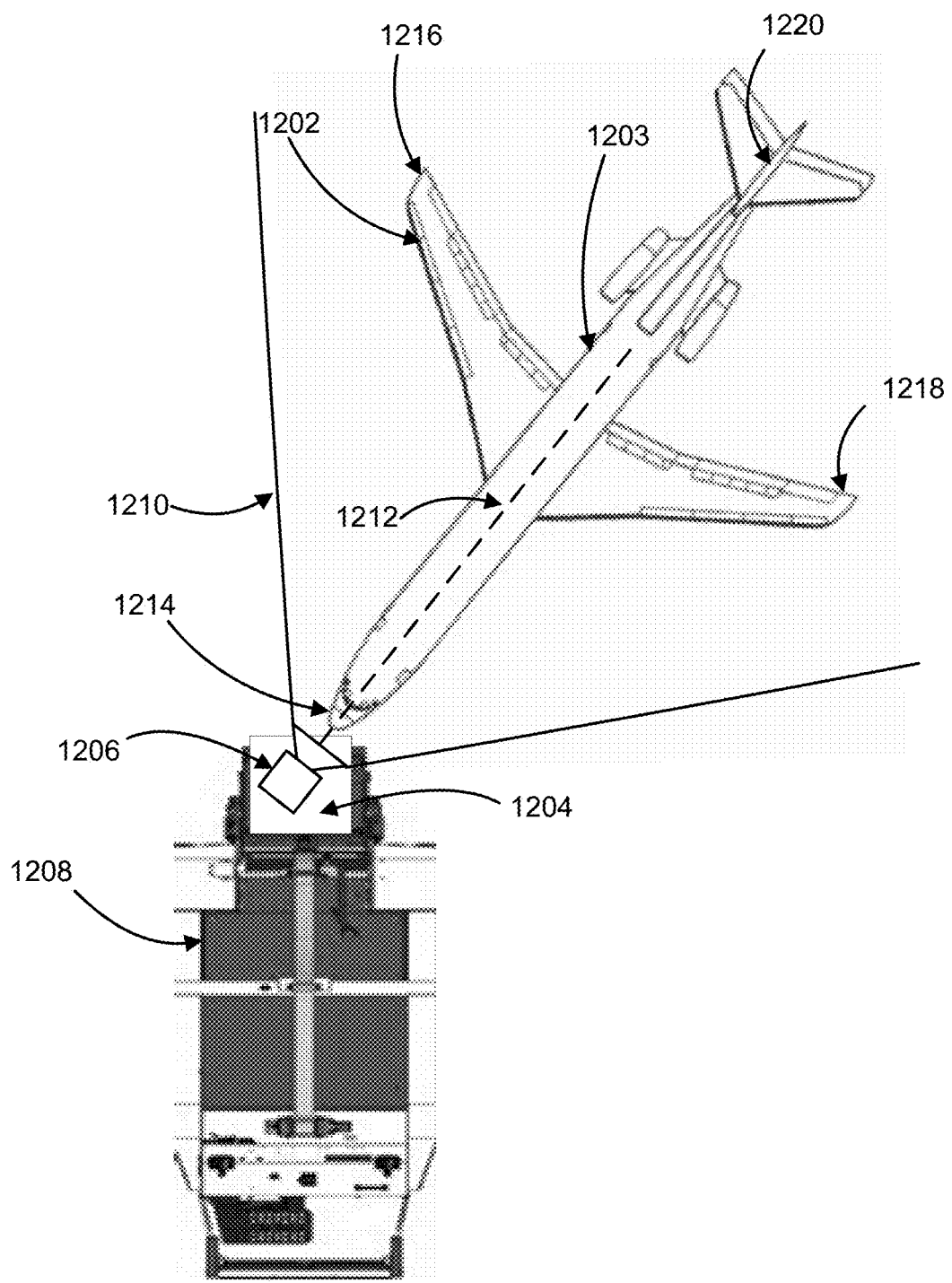
FIG. 15 illustrates the example ACAS of FIG. 12 with the sensing device rotated to align with the fuselage of the airplane.

FIG. 15 illustrates the example ACAS 1204 of FIG. 12 with the sensing device 1206 rotated to align with the fuselage 1203 of the airplane 1202. The sensing device 1206 may be configured to maintain alignment with the fuselage 1203 as the angle of the airplane 1202 to the tug 1208 changes. The ACAS 1204 may determine that the airplane 1202 is rotating relative to the tug 1208 based on a position of a feature of the airplane 1202, such as the nose 1214, the first wing tip 1216, the second wing tip 1218, the tail 1220, or any combination thereof. In response to determining the airplane 1202 is rotating, the ACAS 1204 may rotate the sensing device 1206 to maintain the alignment with the fuselage 1203.

In other examples, the sensing device 1206 may be rotated to align with the fuselage 1203 in response to a portion of the airplane 1202 exiting the field of view 1210 of the sensing device 1206. Upon determining that the airplane 1202 is exiting the field of view 1210, the ACAS 1204 may determine the angle of incidence 1304 and rotate the sensing device 1206 at the angle of incidence 1304.

Figure 16:
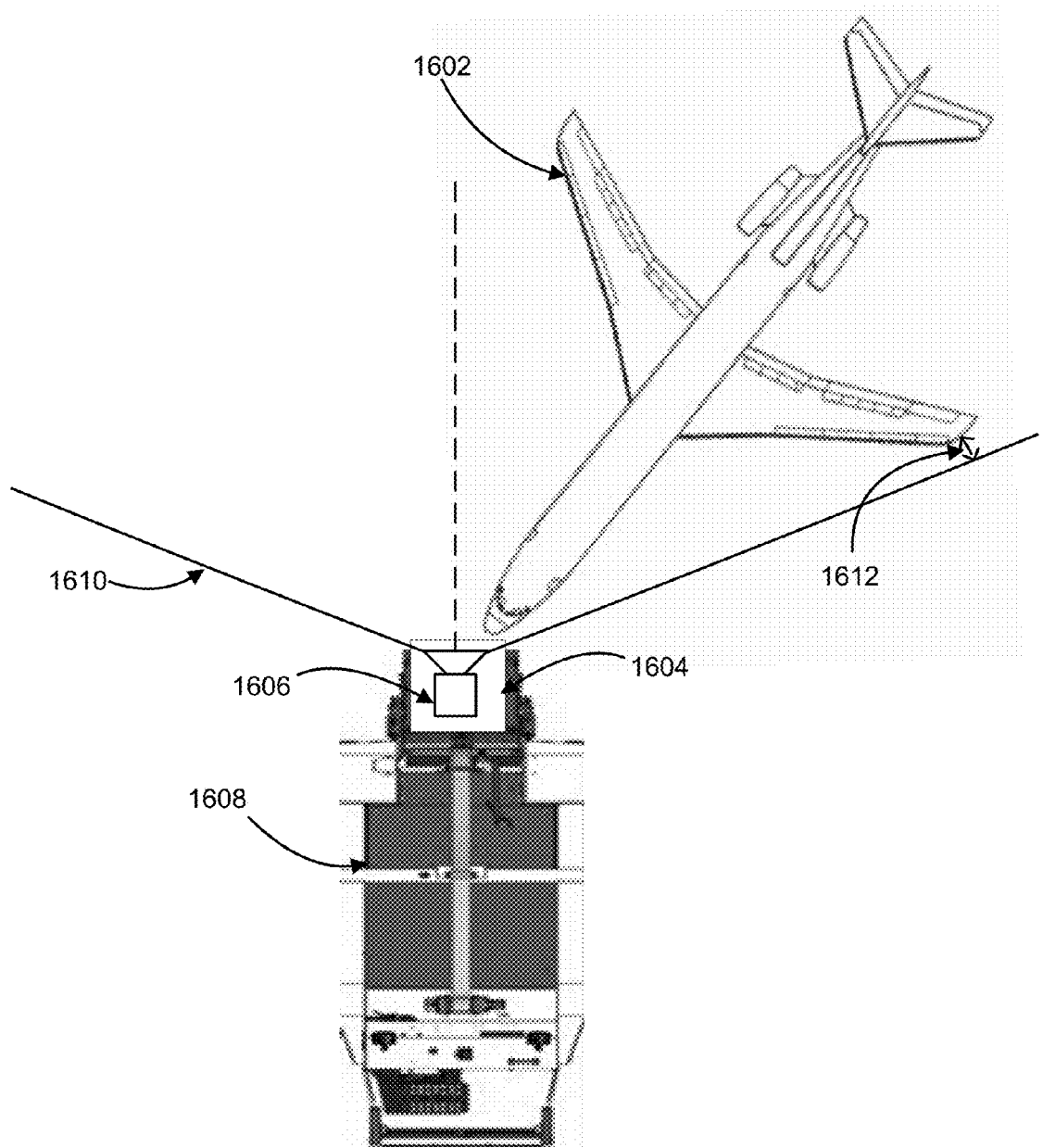
FIG. 16 illustrates an example ACAS with an expanded field of view mounted on a tug.

FIG. 16 illustrates an example ACAS 1604 with an expanded field of view 1610 mounted on a tug 1608. The ACAS 1604 may include a sensing device 1606 may vary the field of view 1610 by decreasing or increasing the area captured, as discussed throughout this disclosure. In response to determining that an airplane 1602 is exiting a current field of view, the sensing device 1606 may increase the field of view 1610 to capture the portion of the airplane exiting the current field of view.

In some examples, the ACAS 1604 may be configured to maintain a predetermined distance 1612 between the edge of the field of view 1610 and the nearest portion of the airplane 1602 to the edge. In response to determining that the distance between the nearest portion of the airplane 1602 and the edge of the field of view 1610 is greater than the predetermined distance 1612, the field of view 1610 may be decreased to maintain the predetermined distance 1612. Further, the field of view 1610 may be increased in response to determining the distance between the nearest portion of the airplane 1602 and the edge of the field of view 1610 is less than the predetermined distance 1612.

Figure 17:
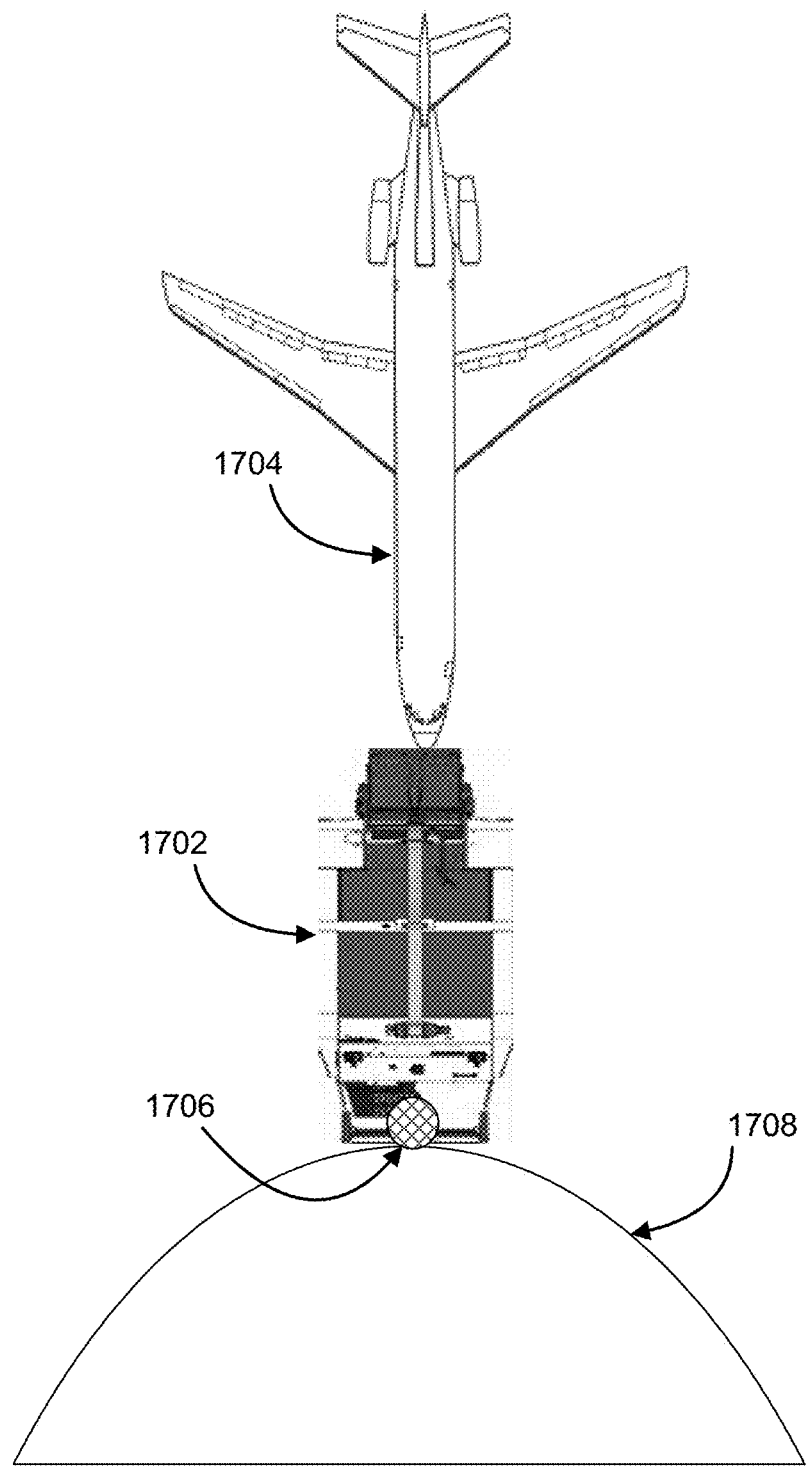
FIG. 17 illustrates another example ACAS mounted on a tug.

FIG. 17 illustrates another example ACAS 1706 mounted on a tug 1702. The ACAS 1706 may include one or more of the features of any of the ACAS described throughout this disclosure. The ACAS 1706 may be located on a rear end of the tug 1702 with a field of view 1708 facing opposite an airplane 1704 under tow. The ACAS 1706 may identify objects behind the tug 1702 and display the objects to a user operating the tug 1702. In some examples, the ACAS 1706 may be activated when the tug 1702 is shifted to reverse.

In some examples, the ACAS 1706 with the field of view 1708 facing opposite the airplane 1704 may be used in combination with the ACAS 604 (FIG. 6) with the field of view 608 (FIG. 6) facing the airplane 1704. The ACAS 1706 and the ACAS 604 may include separate sensing device assemblies and share other components, including a display device, such as the display device 1114 (FIG. 11), a processing unit, such as the processing unit 1112 (FIG. 11), a database, such as database 120 (FIG. 1), or any combination thereof. The display device may display raw images, fused images, and/or combined images from one or both of the ACAS 1706 and the ACAS 604 on split-screen or panoramic view formats such that a user can see in front of the tug 1702 and behind the tug 1702 by looking at the display device.

Figure 18:
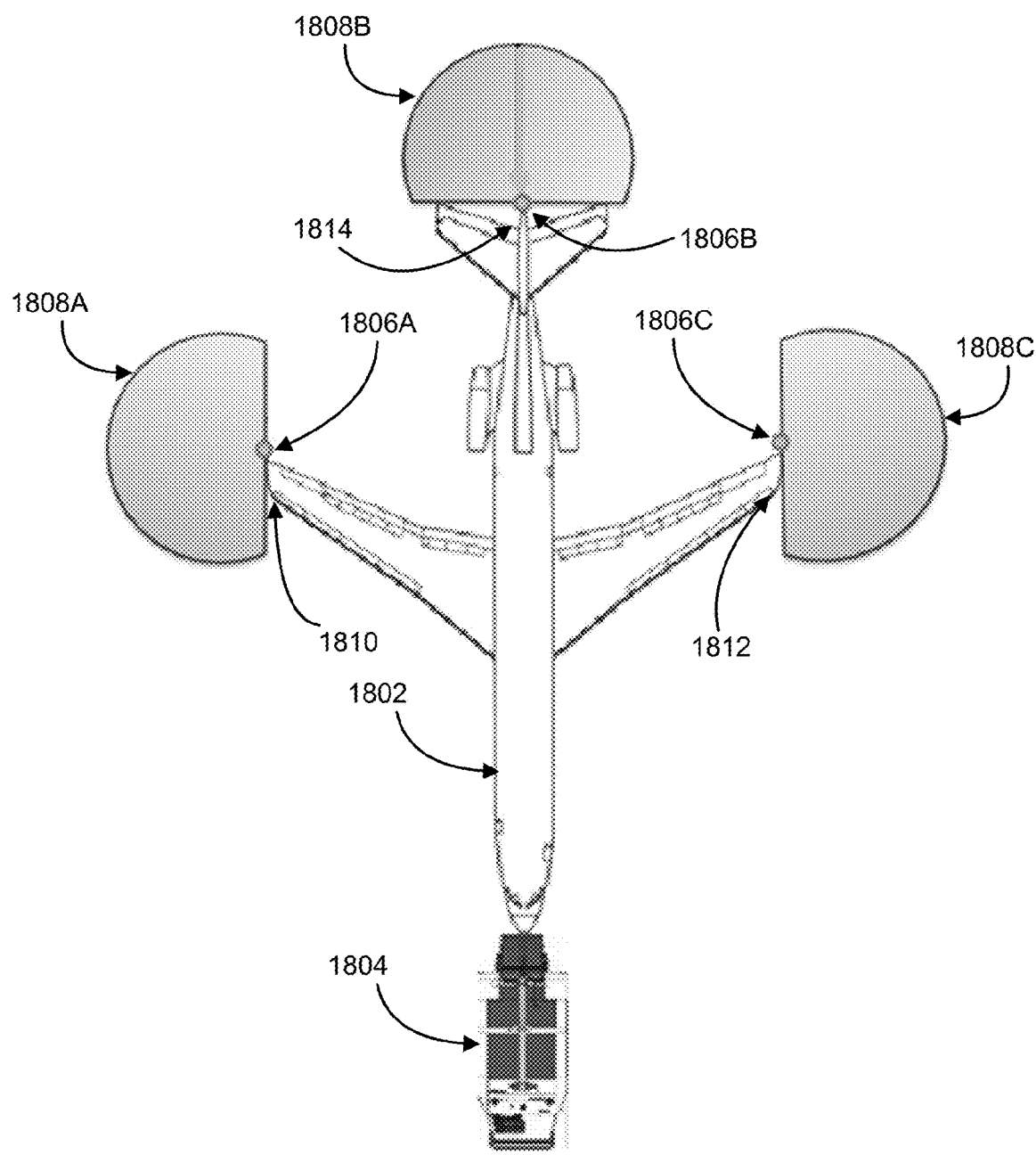
FIG. 18 illustrates an example ACAS mounted on an airplane.

FIG. 18 illustrates an example ACAS 1800 mounted on an airplane 1802. The ACAS may include one or more sensing device assemblies 1806A, 18066 and 1806C located at one or more of a first wing tip 1810, a second wing tip 1812, and a tail 1314 of the airplane 1802. Each sensing device assembly 1806A, 1806B and 1806C may be aimed away from the airplane 1802, having fields of view 1808A, 1808B and 1808C, respectively. The sensing device assemblies 1806A, 1806B and 1806C may include one or more of the features of the sensing device assemblies described throughout this disclosure.

The ACAS 1800 may be installed on airplane 1802 and/or tug 1804 when manufactured, may be installed after manufacture, may be removably placed on the airplane 1802 and/or the tug 1804, or any combination thereof. In some examples, a display device, such as the display device 1114 (FIG. 11), and a processing unit, such as the processing unit 1112 (FIG. 11), may be located on the tug 1804 and the sensing device assemblies 1808A, 1808B and 1808C may be located on the airplane 1802, and the components may wirelessly communicate with each other.

The sensing device assemblies 1806A, 1806B and 1806C may include alarms. The alarms may be integral with the sensing device assemblies 1806A, 1806B and 1806C or may be communicatively coupled to sensing device assemblies 1806A, 1806B and 1806C. The alarms may include visual or audio alerts intended to draw a user's attention. The alarms may include one or more of the features described in relating to the display 702, including the warning sounds.

The alarms may further include lights to draw the attention of the user. The lights may light up, begin to flash, or any combination thereof in response to an object being within a proximity of the airplane 1802. In some examples, the lights may flash at different rates depending on a distance of the object to the airplane 1802. Further, in some examples, the lights may be multiple different colors and may light a certain color based on the distance between the object and the airplane 1802. For example, the lights may be green when the object is within the normal area 706 (FIG. 7), yellow when the object is within the cautionary area 708 (FIG. 7), and red when the object is within the critical area 710 (FIG. 7).

In some examples, the ACAS 1800 may communicate with systems of one or both of the airplane 1802 and the tug 1804. In response to the object being within a certain proximity of the airplane 1802 or the tug 1804, the ACAS 1800 may limit operation of the systems, including shutting off the engines of the airplane 1802, reducing a maximum speed of the tug 1804, preventing movement of the tug 1804 until the object is cleared, limiting movement of the tug 1804 to certain directions, or any combination thereof.

In some examples, the ACAS 1800 may be used in cooperation with one or both of the ACAS 604 (FIG. 6) and the ACAS 1706 (FIG. 17). The ACAS 1800, the ACAS 604 and the ACAS 1706 may have separate sensing device assemblies and may share other components, including a display device, such as the display device 1114 (FIG. 11), a processing unit, such as the processing unit 1112 (FIG. 11), a database, such as database 120 (FIG. 1), or any combination thereof. The display device may display raw images, fused images, or combined images from one or more of the ACAS 1800, the ACAS 604 and the ACAS 1706 in split-screen or panoramic view formats. Thereby, the display device may display a substantially comprehensive view to a user, including in front of the tug 1804, behind the tug 1804, surrounding the airplane 1802, or any combination thereof.

Figure 19:
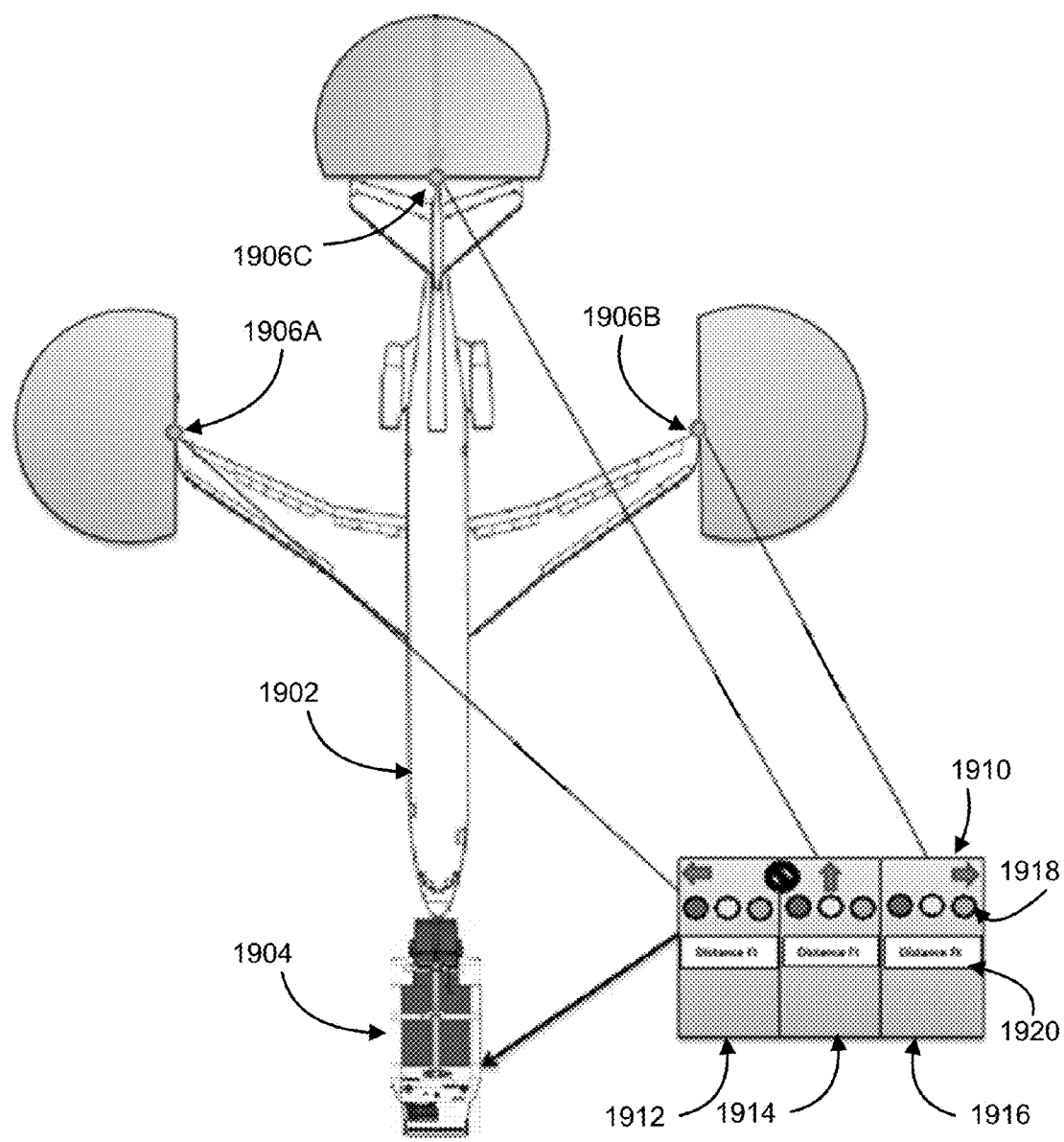
FIG. 19 illustrates an example user display of an ACAS.

FIG. 19 illustrates an example user display 1910 of an ACAS. The ACAS may include one or more features of the ACAS 1800 (FIG. 18). The user display 1910 may be included in the ACAS in lieu of, in addition to, or as part of a display device, such as display device 1114. The user display 1910 may be located in a dashboard of tug 1904 for display to a user operating the tug 1904.

The user display 1910 may include three portions 1912, 1914 and 1916 associated with sensing device assemblies 1906A, 1906B and 1906C, respectively. Each portion 1912, 1914, and 1916 may include three lights 1918, each light being a different color. In response to the ACAS identifying an object proximate to an airplane 1902, one of the three lights may be lit depending on a distance between the object and the airplane 1902. In response to the object being within the normal area 706 (FIG. 7), a green light of the lights 1918 may be lit, in response to the object being within the cautionary area 708 (FIG. 7), a yellow light of the lights 1918 may be lit, and in response to the object being within the critical area 710 (FIG. 7), a red light of the lights 1918 may be lit. In some examples, the lights 1918 may further flash depending on the distance between the object and the airplane 1902.

While the portions 1912, 1914 and 1916 of the user display 1910 have been described with three different lights with each light being a different color, it should be understood that any number of lights may be included in the portions of the user display 1910, the lights 1918 may be different colors than described, and the lights 1918 within a portion may be the same color. In some examples, the number of lights in each portion 1912, 1914 and 1916 of the user display 1910 may be equal to the number of areas, such as the normal area 706, the cautionary area 708 and the critical area 710 (FIG. 7), defined by the ACAS. In other examples, there may be less lights than the number of areas, where none of the lights may light up when the object is in a certain area, such as the normal area 706.

The portions 1912, 1914 and 1916 of user display 1910 may further include an alphanumeric display 1920, which may display characters. The alphanumeric display 1920 may display a distance between a nearest object and the airplane 1902 for a sensing device assembly associated with the portion of the user display 1910. In some examples, the alphanumeric display 1920 may provide a list of objects captured by the sensing device assembly associated with the portion of the user display 1910 and the distance between the object and the airplane 1902 for each object.

In other examples, the user display 1910 may include a single alphanumeric display, such as the alphanumeric display 1920, which display the distance to the closest object to the airplane 1902, a list of some or all of the objects captured by the sensing device assemblies 1906A, 1906B and 1906C and the corresponding distances to the airplane 1902, or any combination thereof. Further, in some examples having the single alphanumeric display, the object or objects displayed in the single alphanumeric display may be accompanied by an indication of the sensing device assembly the object was captured on, a direction to the object, or any combination thereof.

While this disclosure refers to sensing devices throughout, it is to be understood that the sensing devices disclosed herein may be any sensor device that may perform any of the features disclosed, including color sensors, stereo cameras, micro cameras, 3D flash LIDAR cameras, 3D vision systems, signal emitters/receivers, proximity sensors, proximity sensor with broad area optical range finders, other distance sensing devices, radar, ultra wide band radar, or any combination thereof. Further, while this disclosure refers to a tug, the ACAS, or portions thereof, may be incorporated into any vehicle or location proximate to an airplane, including airport terminals, buildings, signs, other relatively immobile structures, refuelers, ground service equipment, baggage movers, ramp equipment, or any combination thereof.

While the ACAS has been discussed in a number of examples as being configured to monitor airplanes, it is to be understood that one or more of the ACAS may also be configured for use with towing other types of aircraft, such as helicopters and gliders. Additionally, it is also to be understood that one or more of the ACAS discussed throughout this disclosure may be used in other applications, such as marine applications, on snow plows, on commercial vehicles, in the trucking industry, or any combination thereof.

In marine applications, any of the ACAS, or a combination thereof, discussed throughout this disclosure may be utilized on boats or barges for prospective collision detection during movements of water borne equipment. For example, a barge may be equipped with any of the sensing device assemblies described throughout this disclosure, and any of the display devices described throughout this disclosure may be provided on an associated tug-boat. Additionally, any of the ASAC discussed throughout this disclosure may be installed on a number of boats, such as sailboats racing in a regatta, or while maneuvering a boat near a dock. The ACAS may effectively communicate the relative position of one boat to the next, and assist in maneuvering techniques to avoid collisions. The ACAS may comprise built-in navigation rules which provide novice sailors assistance in determining right-of way.

For snow plows and commercial vehicles, any of the ACAS, or a combination thereof, discussed throughout this disclosure may be utilized on snow plows and/or other commercial vehicles for prospective collision detection during movements of the equipment. For example, certain sensing device assemblies as discussed throughout this disclosure may be able to detect objects through snow and other precipitation; therefore, one or more of the sensing device assemblies may be mounted on a Snow Plow Vehicle to detect possible collisions with the plow. Similarly, any of the ACAS described throughout this disclosure may be utilized to detect possible collisions with regard to vehicles in the context of rain, snow or other visibility-obscuring precipitation.

In the trucking industry, any of the ACAS, or any combination thereof, may be installed in trucking equipment to facilitate moving of large vehicles in tight quarters and/or hooking up of one or multiple trailers to truck and trailers. For example, sensing devices assemblies as discussed throughout this disclosure may be installed on a trailer, and a display device as discussed throughout this disclosure may be provided in a cab of the truck. The display device may be configured to operate with multiple systems installed on any number of trailers/containers that may be interchangeably towed by the truck. Information received by the ACAS may be stored on a memory device to retain a log of operation, which may be used in the event of a collision. The log may include additional vehicle information such as travel speed and geographic location of the truck and/or trailer, as well as an identification of one of more vehicles involved in the collision for insurance and/or fleet management purposes.

Having described and illustrated examples of systems and methods relating to airplane collision avoidance, it should be apparent that modifications in arrangement and detail may exist without departing from the principles disclosed herein. Accordingly, it should be understood that that any protection granted is not limited by the disclosure, but extends to any and all modifications and variations falling within the spirit and scope of the following claims.

The invention claimed is:

1. A collision avoidance system, comprising:
one or more sensing devices configured to capture image data of at least a portion of an airplane and an object while the airplane is being towed, wherein the one or more sensing devices are located remotely to the airplane, wherein the portion of the airplane is located within a field of view of at least one of the sensing devices, and wherein the at least one sensing device is rotationally mounted to a towing vehicle; and
a processing device communicatively coupled to the one or more sensing devices and configured to:
determine a position of the portion of the airplane based on the captured image data;
determine a position of the object based on the captured image data;
determine an angle of incidence between the airplane and the towing vehicle based on the capture image data; and
vary the field of view of the at least one sensing device based, at least in part, on a comparison of the position of the object relative to the position of the portion of the airplane, wherein the processing device is configured to vary the field of view during a turning operation of the airplane under tow by rotating the at least one sensing device in order to maintain both the object and the portion of the airplane within the field of view, and wherein the at least one sensing device is rotated, relative to the towing vehicle, to match the angle of incidence during the turning operation.

2. The system of claim 1, wherein the processing device is configured to vary the field of view by enlarging the field of view of the at least one sensing device in order to maintain both the object and the portion of the airplane within the field of view.

3. The system of claim 2, wherein the processing device is configured to determine a wingspan of the airplane, and wherein the field of view is enlarged in response to determining the wingspan.

4. A collision avoidance system, comprising:
one or more sensing devices configured to capture image data of at least a portion of an airplane and an object while the airplane is being towed, wherein the one or more sensing devices are located remotely to the airplane, and wherein the portion of the airplane is located within a field of view of at least one of the sensing devices; and
a processing device communicatively coupled to the one or more sensing devices and configured to:
determine a position of the portion of the airplane based on the captured image data;
determine a position of the object based on the captured image data;
vary the field of view of the at least one sensing device based, at least in part, on a comparison of the position of the object relative to the position of the portion of the airplane, wherein the at least one sensing device and the processing device are both located on a towing vehicle configured to tow the airplane, and wherein a second sensing device is located within an airplane hanger; and
combine image data captured by the second sensing device with image data captured by the at least one sensing device for purposes of comparing the position of the object relative to the position of the portion of the airplane.

5. The system of claim 4, wherein the object comprise a portion of the airplane hangar, and wherein the processing device is configured to compare a position of the portion of the hangar relative to the position of the portion of the airplane in response to the airplane being towed into the airplane hangar.

6. The system of claim 4, wherein the second sensing device is associated with a second field of view, wherein the portion of the airplane is captured in an overlapping field of view of both the at least one sensing device and the second sensing device, and wherein the processing device is further configured to generate combined image data by overlaying the portion of the airplane captured in the overlapping field of view to determine the position of the object relative to the position of the portion of the airplane based on the combined image data.

7. A collision avoidance system, comprising:
one or more sensing devices configured to capture image data of at least a portion of an airplane while the airplane is being towed by a towing vehicle, wherein the one or more sensing devices are located remotely to the airplane, wherein at least one of the one or more sensing devices is mounted to the towing vehicle at an elevated position to provide a line of sight, over a fuselage of the airplane, between the at least one sensing device and a tail of the airplane, and wherein the portion of the airplane is located within a field of view of at least one of the sensing devices; and
a processing device communicatively coupled to the one or more sensing devices and configured to modify the field of view of the at least one sensing device based, at least in part, on a change in position of the portion of the airplane relative to the at least one sensing device during a turning operation.

8. The system of claim 7, wherein the processing device is further configured to determine that the airplane is turning based, at least in part, on a change in angular position of the tail with respect to the at least one sensing device, and wherein the field of view is modified to maintain the tail within the modified field of view.

9. The system of claim 7, wherein the at least one sensing device is mounted to the towing vehicle by an adjustable vertical member to adjust the elevated height of the at least one sensing device in order to maintain the line of sight to the tail of the airplane.

10. The system of claim 7, wherein a second sensing device is located remotely to both the airplane and the towing vehicle, wherein the processing device is configured to generate combined image data from the at least one sensing device and the second sensing device, and wherein the change in position of the portion of the airplane is determined based, at least in part, on the combined image date.

11. The system of claim 10, wherein the one or more sensing devices are configured to capture additional image data of a first wingtip of the airplane and a second wingtip of the airplane, and wherein the processing device is configured to determine a wingspan of the airplane based on the additional image data in order to determine a make of the airplane.

12. The system of claim 11, wherein the processing device is configured to access a database comprising dimensional data associated with the make of the airplane, and wherein the field of view is modified based, at least in part, the dimensional data associated with the make of the airplane.

13. The system of claim 12, wherein the processing device is configured to modify the field of view to include one or both of the first wing tip and the second wingtip of the airplane during the turning operation.

14. The system of claim 7, wherein the at least one sensing device comprises a LIDAR camera that emits light photons over the field of view and produces pixels indicating a distance to the portion of the airplane relative to one or more obstacles.

* * * * *